US010556463B2

(12) United States Patent
Neutsch

(10) Patent No.: US 10,556,463 B2
(45) Date of Patent: Feb. 11, 2020

(54) WHEEL UNIT

(71) Applicant: Gustav Magenwirth GmbH & Co. KG, Bad Urach (DE)

(72) Inventor: Christian Neutsch, Reutlingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 260 days.

(21) Appl. No.: 15/358,992

(22) Filed: Nov. 22, 2016

(65) Prior Publication Data

US 2017/0151833 A1     Jun. 1, 2017

(30) Foreign Application Priority Data

Nov. 27, 2015   (DE) .................. 10 2015 120 656

(51) Int. Cl.
| | | |
|---|---|---|
| B60B 27/00 | (2006.01) | |
| B60B 1/00 | (2006.01) | |
| B60B 27/02 | (2006.01) | |
| B62M 6/40 | (2010.01) | |
| B62K 3/02 | (2006.01) | |
| B62K 25/00 | (2006.01) | |

(52) U.S. Cl.
CPC .......... *B60B 27/0052* (2013.01); *B60B 1/003* (2013.01); *B60B 27/0068* (2013.01); *B60B 27/023* (2013.01); *B62M 6/40* (2013.01); *B62K 3/02* (2013.01); *B62K 25/00* (2013.01)

(58) Field of Classification Search
CPC . B60B 27/0052; B60B 27/0068; B60T 8/329; B62M 6/40; B62M 6/50
See application file for complete search history.

(56) References Cited

U.S. PATENT DOCUMENTS

| | | | |
|---|---|---|---|
| 6,492,805 B1 | 12/2002 | Wakabayashi | |
| 7,322,437 B2* | 1/2008 | Toyoda | B62J 99/00 |
| | | | 180/219 |
| 7,661,771 B2* | 2/2010 | Nimura | B60T 8/1706 |
| | | | 180/219 |
| 7,901,013 B2* | 3/2011 | Ishida | B60T 8/171 |
| | | | 303/137 |
| 8,991,543 B2* | 3/2015 | Nagakubo | B62K 19/38 |
| | | | 180/219 |
| 9,145,028 B2* | 9/2015 | Mori | B60T 8/1706 |
| 9,604,687 B2* | 3/2017 | Asano | B60G 21/05 |
| 2008/0111342 A1 | 5/2008 | Niekerk | |
| 2013/0026731 A1* | 1/2013 | Mikura | B60B 27/0068 |
| | | | 280/279 |

(Continued)

FOREIGN PATENT DOCUMENTS

| | | |
|---|---|---|
| DE | 602005003495 T2 | 11/2008 |
| DE | 10 2008 019469 A1 | 10/2009 |

(Continued)

*Primary Examiner* — Joseph M Rocca
*Assistant Examiner* — Michael R Stabley
(74) *Attorney, Agent, or Firm* — Reinhart Boerner Van Deuren P.C.

(57) ABSTRACT

In order to improve a wheel unit for a bicycle, comprising a hub and a wheel rim, which is arranged rotatably about an axis of rotation, wherein the hub and the wheel rim are connected to one another by spokes, it is proposed to arrange a brake disc and a sensor ring comprising a sensing region on the hub and to arrange the sensor ring adjacent to the brake disc.

38 Claims, 24 Drawing Sheets

(56) References Cited

U.S. PATENT DOCUMENTS

2016/0016631 A1* 1/2016 Thompson ........... B62K 15/008
                                                   280/283

FOREIGN PATENT DOCUMENTS

| DE | 212011100135 U1 | 6/2013 |
|----|---|---|
| EP | 1580109 B1 | 11/2007 |
| EP | 2749465 A1 | 7/2014 |

* cited by examiner

XII - XII

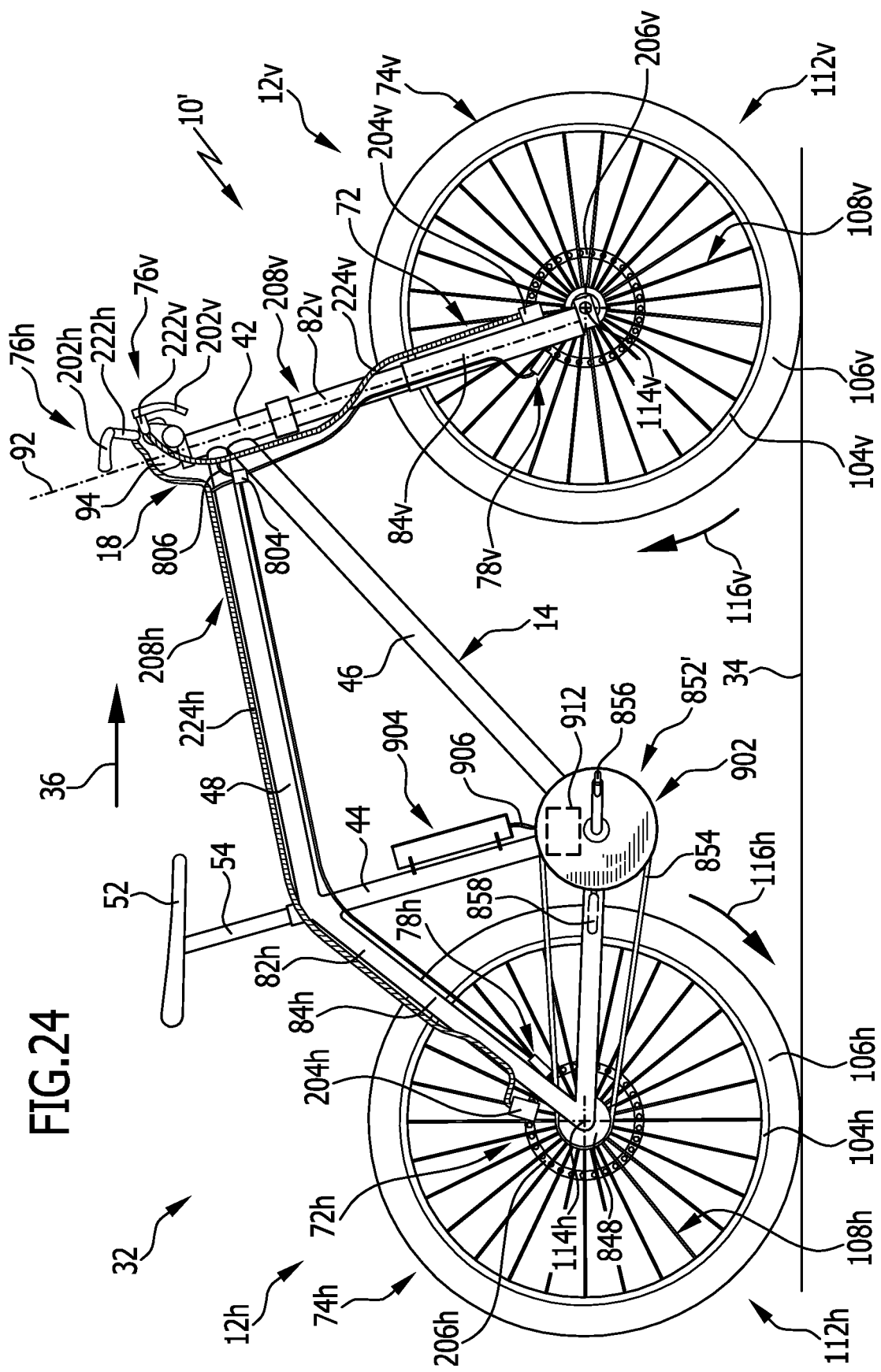

WHEEL UNIT

CROSS-REFERENCE TO RELATED PATENT APPLICATION

This patent application claims the benefit of German application No. 10 2015 120 656.0, filed Nov. 27, 2015, the teachings and disclosure of which are hereby incorporated in their entirety by reference thereto.

BACKGROUND OF THE INVENTION

The invention relates to a wheel unit for a bicycle, comprising a hub and a wheel rim, which is arranged rotatably about an axis of rotation, wherein the hub and the wheel rim are connected to one another by spokes.

Wheel units of this type for bicycles are known from the prior art.

These wheel units are configured for the demands placed on bicycles, as will be described by way of example hereinafter, and these wheel units for bicycles are mountable on the bicycle.

The bicycle comprises a front wheel unit and a rear wheel unit, wherein the wheel units are connected to one another by a frame.

In conjunction with this disclosure, a bicycle is understood to mean a vehicle which is driven only by the muscle power of a rider or which can be driven by the muscle power of the rider and comprises an auxiliary drive which in particular operates in a manner free from exhaust gas, for example without $CO_2$ emission, wherein the auxiliary drive in particular supplements the drive by human muscle power and/or replaces this, for example in phases, in particular in the case of sections of a route that are very tiring for the rider.

The auxiliary drive comprises in particular an electric drive motor, which is preferably fed with electrical energy from a power store or from a fuel cell.

By way of example, the auxiliary drive and therefore in particular also the bicycle does not require any fossil fuels in order to be driven.

The term "bicycle" in the sense used herein therefore in particular includes bicycles which are drivable only by the muscle power of the rider and also bicycles which are drivable for example by the muscle power of the rider and which have a permanently operating or connectable auxiliary drive, for example e-bikes and pedelecs, that is to say electrically driven bicycles.

In particular, bicycles of this type reach maximum speeds of at most 100 km/h, for example at most 80 km/h, in particular at most 60 km/h, in particular at most 40 km/h.

The bicycle and therefore in particular also the wheel unit for the bicycle is thus of a lightweight construction for a maximum speed of this type.

In addition, bicycles in the sense used herein are lightweight vehicles weighing for example at most 100 kg, in particular at most 80 kg, particularly expediently at most 50 kg, in particular at most 30 kg, such that the wheel unit of the bicycle is designed to be loaded by a maximum weight of this type plus the weight of the rider.

The object of the invention is to improve a wheel unit of the above general type for a bicycle.

SUMMARY OF THE INVENTION

This object is achieved in the case of a wheel unit according to the invention of the type described in the introduction in such a way that a brake disc and a sensor ring comprising a sensing region are arranged on the hub, and the sensor ring is arranged adjacent to the brake disc.

One of the advantages of the solution according to the invention is considered to be the fact that, by means of the sensor ring, the wheel unit is detectable by a sensor and therefore the wheel unit is designed in such a way that rolling properties of the wheel unit, for example a rotational speed of a wheel of the wheel unit, is determinable by the sensor.

Since the sensor ring is arranged adjacent to the brake disc, only a small installation space is required for the two elements, and therefore the sensor ring is mountable on the hub, additionally to the brake disc, even though there is little free installation space available in the wheel units for bicycles of the above general type.

A further advantage of the solution according to the invention is considered to be the fact that, due to the arrangement according to the invention of the brake disc and the sensor ring, the brake disc is mountable in accordance with the conventional standardisations, for example, with respect to the arrangement of the brake disc, in a direction that is axial relative to the axis of rotation.

Here, various arrangements of the sensor ring being adjacent to the brake disc are conceivable.

In an advantageous embodiment, provision is made that the sensor ring is supported on the brake disc and therefore on the one hand the two elements are mounted in a manner closely adjacent to one another, such that only an extremely small installation space is necessary, and on the other hand a stable arrangement of the elements is made possible as a result.

In a further particularly favourable embodiment, provision is made that the sensor ring is directly adjacent to the brake disc, and therefore no further installation space is required between the two elements.

In a further particularly advantageous embodiment, an intermediate layer is arranged between the sensor ring and the brake disc.

By way of example, the intermediate layer reduces the noise generation of the brake disc and the sensor ring and/or protects the components against corrosion.

By way of example, the intermediate layer is formed at least in part as a plastics layer.

In particular, the intermediate layer is substantially an adhesive film.

In a further advantageous embodiment, provision is made that the intermediate layer comprises a coating.

The intermediate layer advantageously comprises a sealing paper.

In a particularly advantageous embodiment, provision is made that the intermediate layer, with respect to the direction that is axial relative to the axis of rotation, has a thickness that is less than 1.5 mm, for example less than 1.2 mm, in particular less than 1 mm, particularly preferably less than 0.8 mm.

With regard to the configuration of the brake disc, no further details have been given before now.

By way of example, the brake disc is powder-coated, whereby the brake disc is protected against external influences and a longer service life is made possible.

It is also conceivable that the brake disc is lacquered, for example.

In a particularly preferred embodiment, provision is made that the brake disc, with respect to an extent in a direction that is axial relative to the axis of rotation, has a thickness for example greater than 1 mm, in particular greater than 1.5 mm, particularly preferably greater than 1.8 mm, and for example provision is made that the thickness of the brake disc, with respect to the extent in the direction that is axial relative to the axis of rotation, is less than 4 mm, in particular less than 3.7 mm, particularly preferably less than 3.3 mm.

Provision is favourably made that the brake disc comprises a plurality of supporting bars, which support a brake ring.

By way of example, at least three, particularly preferably at least five supporting bars are provided, and in particular at most 20, in particular at most 15 supporting bars are provided, and in a particularly advantageous embodiment seven supporting bars are provided.

By way of example, the supporting bars are oriented at a slight incline to the direction of the brake disc that is radial relative to the axis of rotation, and in particular the supporting bars are arcuate, whereby the stability of the brake disc is increased and the supporting bars can compensate for differing degrees of expansion of individual regions of the brake disc on account of temperature differences in the various regions and/or material differences.

By way of example, the supporting bars connect the brake ring to a mounting ring of the brake disc, wherein the brake disc is mountable on the hub by means of the mounting ring.

Due to the supporting bars, the brake ring and the mounting ring are connected to one another in a stable manner, wherein, however, a certain flexibility is achieved with the plurality of supporting bars so as to compensate for an expansion of the brake ring on account of a braking action and the resultant temperature increase in the brake ring.

In particular, the supporting bars are arranged periodically in a peripheral direction running peripherally around the axis of rotation.

In a particularly advantageous embodiment, provision is made that N supporting bars are arranged on the brake disc and the arrangement of the supporting bars is rotationally symmetrical with respect to a rotation about a brake disc axis with an angle of 360°/N, wherein N is the number of supporting bars.

The supporting bars are therefore arranged symmetrically about the axis of rotation and do not hinder the rolling properties of the wheel unit, in particular of the wheel.

With regard to the configuration of the sensor ring, no further details have been given before now.

Provision is advantageously made that the sensor ring extends substantially in a sensor ring plane running perpendicularly to a sensor ring axis.

By way of example, provision is made that the sensor ring, in a direction that is axial relative to the sensor ring axis, has a thickness which for example is less than 2 mm, in particular less than 1.5 mm, particularly favourably less than 1.2 mm.

In principle, it is conceivable that the sensor ring in an unassembled state is disc-like, in particular is planar.

In a particularly favourable embodiment, provision is made that the sensor ring in the unassembled state is provided in the form of a plate, wherein a sensor ring in the form of a plate is to be understood in particular to mean that the sensor ring is slightly curved in a direction that is radial relative to the sensor ring axis.

In a particularly advantageous embodiment, provision is made that, in the unassembled state, an inner region of the sensor ring is spaced from the sensor ring plane, which is defined here by an outer region of the sensor ring.

It is particularly favourable if the sensor ring is mounted on the hub with a bias, and is therefore mounted in a manner bearing against the brake disc.

In a particularly favourable embodiment, provision is made that the outer region of the sensor ring is arranged in a manner bearing against the brake disc under the action of a force, whereby the sensor ring particularly favourably bears against the brake disc, in particular is supported thereon, and the arrangement achieves a particularly advantageous stability.

With regard to the configuration of the sensing region, no further details have been given before now.

It is particularly favourable if the sensing region is arranged adjacent to the supporting bars.

In an advantageous embodiment, provision is made that the sensing region is supported on the supporting bars of the brake disc.

In a particularly advantageous manner, the sensing region has a structure that varies periodically along the peripheral direction around the sensor ring axis, and therefore a sensor, when the sensing region rotates, receives a temporally periodic signal depending on the rotational speed.

It is particularly advantageous if the periodically varying structure in the sensing region is rotationally symmetrical with respect to a rotation about the sensor ring axis with an angle of 360°/kN, wherein kN corresponds to the number N of supporting bars of the brake disc or an integer multiple thereof, wherein k is thus a natural number.

By way of example, k is greater than 4, in particular greater than 6, and in particular k is less than 20, in particular less than 15.

Here, the periodically varying structure can be formed in different ways.

By way of example, the sensor ring comprises different materials in different areas in the sensing region, and therefore the periodically varying structure is formed by a material composition of the sensor ring that varies periodically along the peripheral direction.

By way of example, it is also conceivable that the periodically varying structure is formed by a periodically varying material density.

By way of example, an optical and/or an electronic and/or a magnetic material property of a material forming the sensor ring in the sensing region varies periodically along the peripheral direction around the axis of rotation, and therefore the periodically varying structure is formed for example by a periodically varying material composition or the periodically varying material properties.

By way of example, the sensor ring has, in the sensing region, a surface structure that varies periodically along the peripheral direction around the axis of rotation, formed for example by raised portions and/or recesses, in particular formed by a surface coating, and this periodically varying surface structure forms the periodically varying structure in the sensing region.

In a particularly advantageous embodiment, provision is made that the periodically varying structure is configured so as to influence a magnetic field to differing degrees in a periodically varying manner along the peripheral direction around the sensor ring axis, wherein, by way of example, the sensor ring in the sensing region influences the strength and/or orientation of a magnetic field penetrating the sensing region.

One advantage of the structure influencing a magnetic field to differing degrees in a periodically varying manner is that smaller impurities, for example dirt, which often occur with use of the wheel unit and which at most influence a magnetic field only weakly, at most only weakly influence the effect of the periodically varying structure influencing a magnetic field to differing degrees in a periodically varying manner.

Here, it is conceivable in principle that for example the sensing region is constructed from regions magnetised to differing degrees, and it is also conceivable that in particular the sensor ring in the sensing region comprises, in different areas, different magnetic-field-influencing materials.

By way of example, the periodically varying structure is formed as a toothed structure.

In a particularly favourable embodiment, provision is made that the periodically varying structure is formed by apertures and material bridges arranged in a regularly alternating manner, whereby a periodically varying structure, in particular a toothed structure, is provided in a structurally simple manner.

By way of example, the periodic arrangement of apertures and material bridges thus also influences a magnetic field to varying degrees, since the apertures influence a magnetic field penetrating through these apertures differently compared to an area of the sensing region in which one of the material bridges is arranged.

Here, provision is made particularly advantageously that the apertures extend in an elongate manner in the direction that is radial relative to the sensor ring axis.

In principle, it is conceivable that an odd number of apertures is provided, but it is also conceivable that an even number of apertures is provided.

In a particularly advantageous embodiment, provision is made that mN apertures and mN material bridges are arranged in the sensing region, wherein mN corresponds to the number N of supporting bars of the brake disc or an integer multiple thereof, i.e. provision is made that m is a natural number.

In particular, it is advantageous if at least 20, favourably at least 30, particularly preferably at least 40, and in particular at least 50 apertures are provided in the sensing region.

Particularly preferably less than 200, in particular less than 180, particularly favourably less than 150, in particular less than 120 apertures are provided in the sensing region.

It is particularly favourable if the apertures and the material bridges are arranged rotationally symmetrically with respect to a rotation about the sensor ring axis with an angle of 360°/IN, wherein IN corresponds to the number N of supporting bars of the brake disc or an integer multiple thereof, that is to say I is thus a natural number.

Here, provision is made in particular that the angle 360°/IN with respect to which the arrangement of the apertures and the material bridges is rotationally symmetrical relative to the sensor ring axis is the same size as the angle 360°/kN with respect to which the periodically varying structure is rotationally symmetrical relative to the sensor ring axis.

If the material bridges are identical and the apertures are identical, the number mN of the material bridges and of the divisors IN in the angle 360°/IN with respect to which the arrangement of the material bridges and of the apertures is rotationally symmetrical relative to the sensor ring axis is in particular the same, but it is also conceivable for IN and mN to be different numbers.

In a particularly advantageous embodiment, provision is made that the apertures and the material bridges are arranged periodically between the supporting bars of the brake disc along the peripheral direction around the axis of rotation, such that the collective arrangement of apertures, material bridges and the supporting bars forms a structure running periodically along the peripheral direction around the axis of rotation.

It is particularly favourable if the apertures run at an incline to the direction that is radial relative to the sensor ring axis, in particular similarly to the way in which the supporting bars of the brake disc are oriented in relation to the direction that is radial relative to the sensor ring axis.

In a particularly advantageous embodiment, provision is made that a width of the apertures transversely to the direction that is radial relative to the sensor ring axis is smaller than a width of the supporting bars of the brake disc transversely to the direction that is radial relative to the brake disc axis, such that the supporting bars of the brake disc can each cover at least one aperture of the sensor ring.

Provision is made particularly advantageously that each edge of each of the supporting bars is arranged in an area of the sensing region that heavily influences a magnetic field, in particular in a mounting position of the brake disc and the sensor ring on the hub, whereby an edge of one of the supporting bars does not hinder the structure of the sensing region influencing a magnetic field to differing degrees or only hinders said structure insignificantly.

In a particularly advantageous embodiment, an edge of each of the supporting bars is covered by one of the material bridges in the sensing region, whereby the periodically varying structure is not hindered in the sensing region by the arrangement of the brake disc, or at most is only hindered thereby insignificantly.

Provision is made in particular that the supporting bars of the brake disc are arranged periodically along the peripheral direction around the axis of rotation to form the periodically varying structure of the sensing region, such that, in particular in the mounting position of the brake disc and of the sensor circle on the hub, the supporting bars of the brake disc and the periodically varying structure of the sensing region form a collectively periodically varying structure in the sensing region.

Provision is made advantageously that each of the supporting bars fully covers at least one of the apertures.

By way of example, provision is made that at least some, in particular each, of the supporting bars cover/covers precisely one of the apertures fully.

It is also conceivable that at least some, in particular each, of the supporting bars cover/covers for example two apertures, in particular three apertures fully.

In a further advantageous embodiment, provision is made that the supporting bars cover different numbers of apertures, wherein the number of the different multiple of covered apertures is periodic along the peripheral direction around the axis of rotation.

In a particularly favourable embodiment, provision is made that each of the apertures is either fully covered by a supporting bar or is exposed, whereby the sensor thus receives only two different, but clearly defined signals in the case of the apertures, specifically either the signal of a fully covered aperture or the signal of an exposed aperture, and therefore the magnetic-field-influencing effect of one of the apertures is not influenced by an edge of one of the supporting bars.

It is particularly preferable if the covered apertures and the exposed apertures are arranged periodically along the peripheral direction around the sensor ring axis, such that, even in the mounting position, the sensor region has a structure that varies periodically along the peripheral direction around the sensor ring axis.

By way of example, provision is made that a certain number of exposed apertures, for example at least three, in particular at least five, for example at most twelve exposed apertures, follow a covered aperture.

Here, it is also conceivable that a certain number of exposed apertures, for example at least three, in particular at least five, for example at most twelve exposed apertures, are arranged at two adjacent covered apertures.

In a particularly favourable embodiment, provision is made that retaining bars of the sensor ring hold the sensing region on a mounting ring of the sensor ring, such that the sensing region is held in a stable manner on the mounting ring and a certain flexibility is achieved by the construction of the retaining bars.

Here, the mounting ring of the sensor ring is mountable in particular on the hub.

In a particularly preferred embodiment, provision is made that the sensor ring and the brake disc are arranged on the hub in such a way that the supporting bars of the brake disc and the retaining bars of the sensor ring cover one another in the direction that is axial relative to the axis of rotation.

Here, retaining bars and supporting bars that cover one another are to be understood in particular to mean that the retaining bars and supporting bars are formed similarly, and the retaining bars and supporting bars are arranged adjoining one another congruently.

It is also conceivable that the retaining bars and the supporting bars are formed differently, but similarly, and then supporting bars and retaining bars that cover one another is to be understood to mean that the smaller element of the two, in a region, is arranged adjacent to the larger element of the two, such that the smaller element of the two is covered by the large element of the two in the direction of the direction that is axial relative to the axis of rotation.

In a particularly advantageous embodiment, provision is made that the wheel unit comprises a sensor for detecting the sensing region.

Here, any sensor which senses the periodically varying structure, for example the toothed structure, in particular material bridges and apertures arranged in a periodically alternating manner, can be provided in principle.

Here, it is conceivable that the sensor is an optical sensor which detects optical properties, in particular of the sensor ring in the sensing region.

In a particularly favourable embodiment, provision is made that the sensor is a magnetic sensor which detects magnetic-field-influencing structures, in particular the magnetic-field-influencing structure of the sensing region.

Provision is made advantageously that the sensor is formed as a Hall sensor.

In particular, provision is made advantageously that the sensor detects the periodically varying structure, in particular the toothed structure in the sensing region.

In a particularly favourable embodiment, the sensor detects the sensing region in the direction that is radial relative to the axis of rotation.

In a further, particularly advantageous embodiment, the sensor detects the sensing region in the direction that is axial relative to the axis of rotation.

In particular, provision is made that the wheel unit comprises a brake caliper, which cooperates with the brake disc in a braking manner.

In a particularly advantageous embodiment, provision is made that the brake caliper comprises an enclosure, in which the sensor is arranged, and therefore the sensor is arranged at a point protected against external influences and no additional installation space is required by the arrangement of the sensor within the brake caliper.

It is particularly expedient if the hub is arranged on a wheel suspension of the wheel unit in a manner rotatable about the axis of rotation.

In a particularly preferred embodiment, provision is made that the sensor is arranged on the wheel suspension.

Alternatively or additionally, the invention comprises a bicycle of the type described in the introduction.

Here, provision is made particularly advantageously that at least one of the wheel units of the bicycle comprises one or more of the above features, whereby the above-mentioned advantages can be conferred on the bicycle.

In a particularly favourable embodiment, provision is made that the front wheel unit comprises one or more of the above features and the rear wheel unit comprises one or more of the above features and therefore one or more of the above-mentioned advantages can be conferred particularly favourably on the bicycle.

It is particularly preferred if the bicycle comprises a muscle-driven drive system.

In a particularly advantageous embodiment, provision is made that the bicycle comprises an auxiliary drive.

Here, provision is made in particular that the auxiliary drive comprises an electric drive motor.

In a particularly advantageous embodiment, provision is made that the bicycle comprises an anti-lock braking system, wherein the anti-lock braking system comprises a control unit and a pressure regulation unit, and the sensors of the front wheel unit and of the rear wheel unit transmit the rotational speeds of the wheel of the front wheel unit and of the wheel of the rear wheel unit to the control unit and the pressure regulation unit is connected to a hydraulics system of the brake device of the front wheel unit, and for example of the rear wheel unit, wherein the control unit actuates the pressure regulation unit depending on the determined rotational speeds of the front and rear wheel, and, when one of the wheels is locked, for example when one of the wheels has a much slower rotational speed with respect to the rotational speed of the other wheel during a braking operation, the control unit actuates the pressure regulation unit such that the pressure regulation unit reduces the pressure in the hydraulics system, for example by diverting hydraulic fluids into a temporary store, and therefore the brake caliper and the brake ring cooperate in a braking manner to a lesser extent and the locking of the wheel is overridden.

Further features and advantages of the solution according to the invention are the subject of the following description and of the schematic presentation of some exemplary embodiments.

BRIEF DESCRIPTION OF THE DRAWINGS

FIG. 24 shows a side view of a second exemplary embodiment of a bicycle according to the invention.

DETAILED DESCRIPTION OF THE INVENTION

Figure 1:
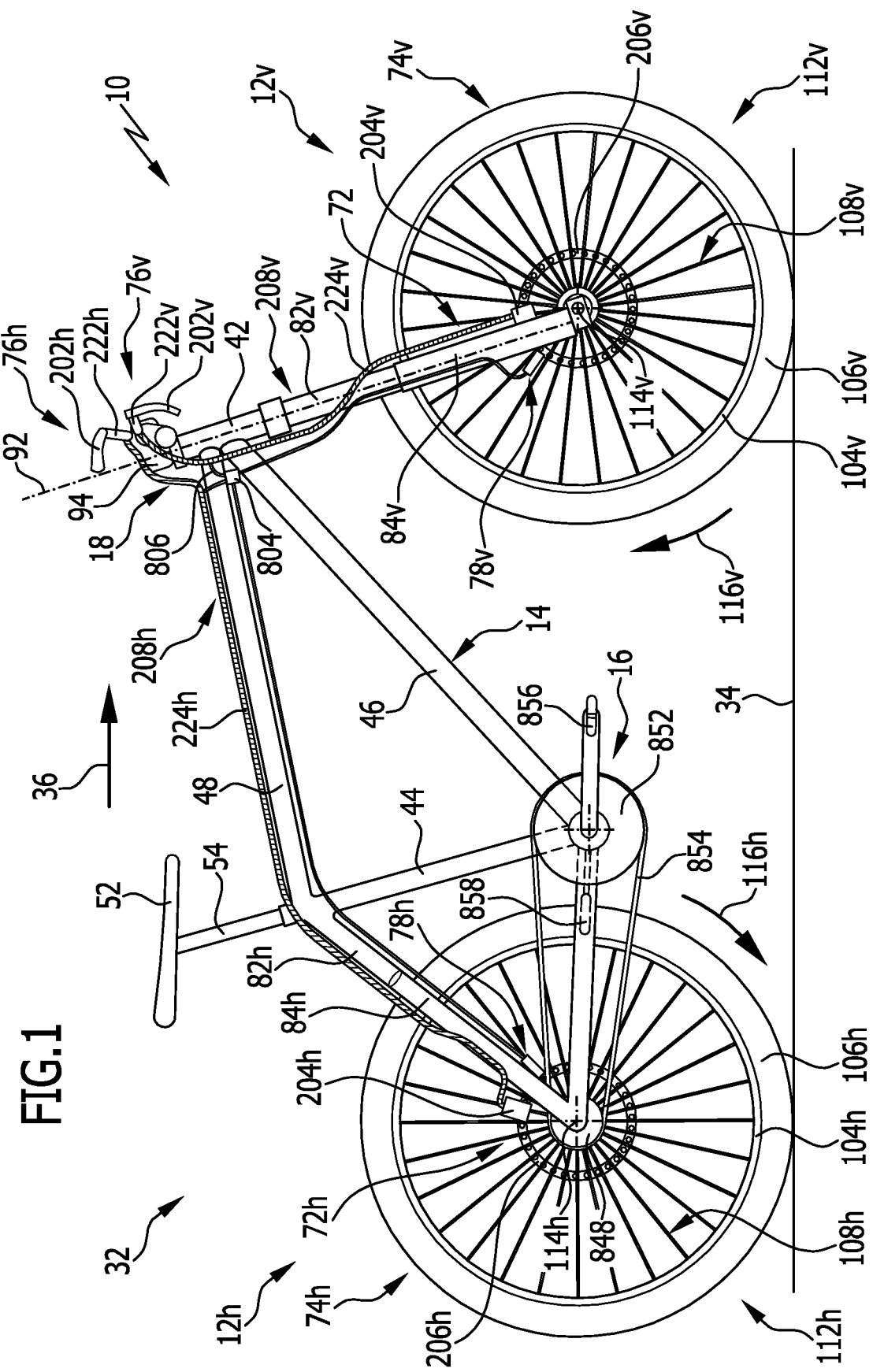
FIG. 1 shows a side view of a first exemplary embodiment of a bicycle according to the invention.

A first exemplary embodiment of a bicycle according to the invention illustrated by way of example in FIG. 1 and denoted as a whole by 10 comprises a front wheel unit 12v and a rear wheel unit 12h, which are connected to one another by a frame 14, and also comprises a muscle-driven bicycle drive system, which is denoted as a whole by 16 and which is driven by the muscle power of a rider, and lastly comprises an anti-lock braking system 18.

Here, the bicycle 10 extends substantially in a main plane 32, which in FIG. 1 corresponds substantially to the drawing plane, and, in the case of the bicycle 10 standing in FIG. 1 on a horizontal standing surface 34 in a state ready to travel, runs substantially transversely, in particular perpendicularly to the standing surface 34, and, in relation to a bicycle orientation 36, which corresponds to the direction of travel when the bicycle 10 travels in a straight line, the front wheel unit 12v is arranged in a front region of the bicycle 10 and the rear wheel unit 12h is arranged in a rear region of the bicycle 10.

The frame 14 comprises a head tube 42, on which the front wheel unit 12v is arranged rotatably, and a rear strut 44, on which the rear wheel unit 12h is arranged, wherein the head tube 42 and the rear strut 44 are connected to one another by a first tube 46 and for example a further, second tube 48.

A saddle 52 with a saddle tube 54 is arranged on the frame 14.

Figure 2:
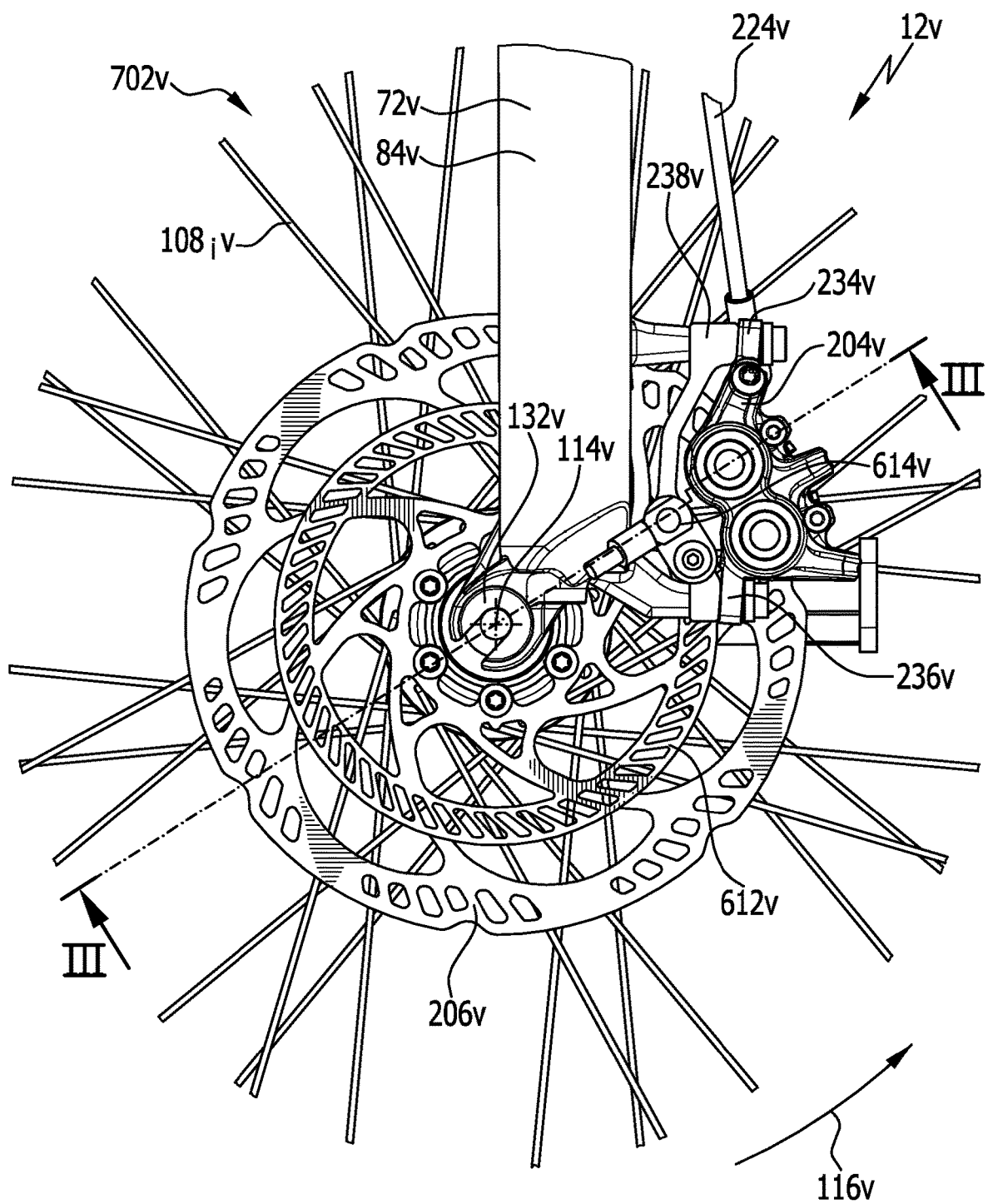
FIG. 2 shows a side view of a detail of a first exemplary embodiment of a front wheel unit according to the invention for a bicycle.
Figure 3:
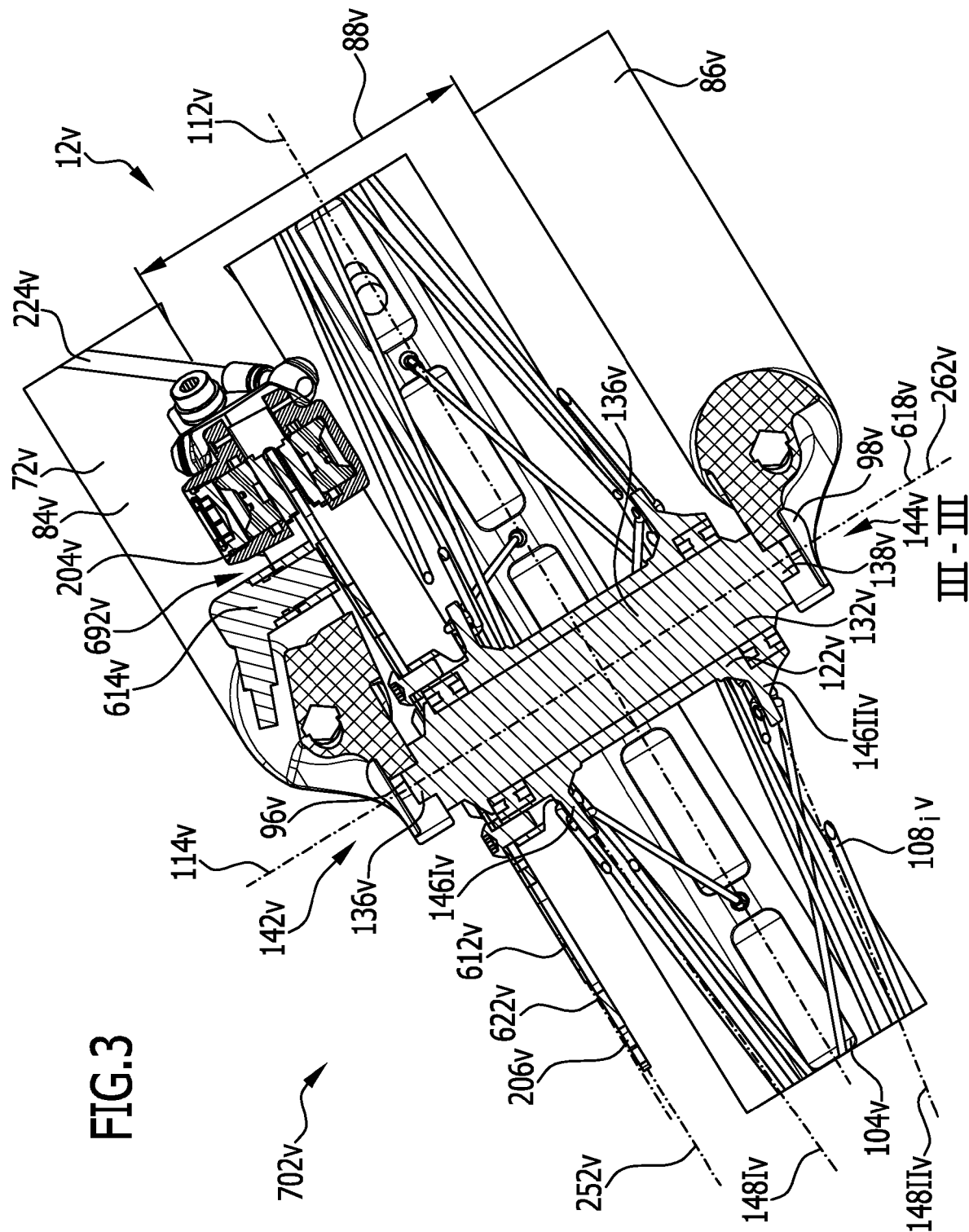
FIG. 3 shows a section III-III according to FIG. 2.
Figure 4:
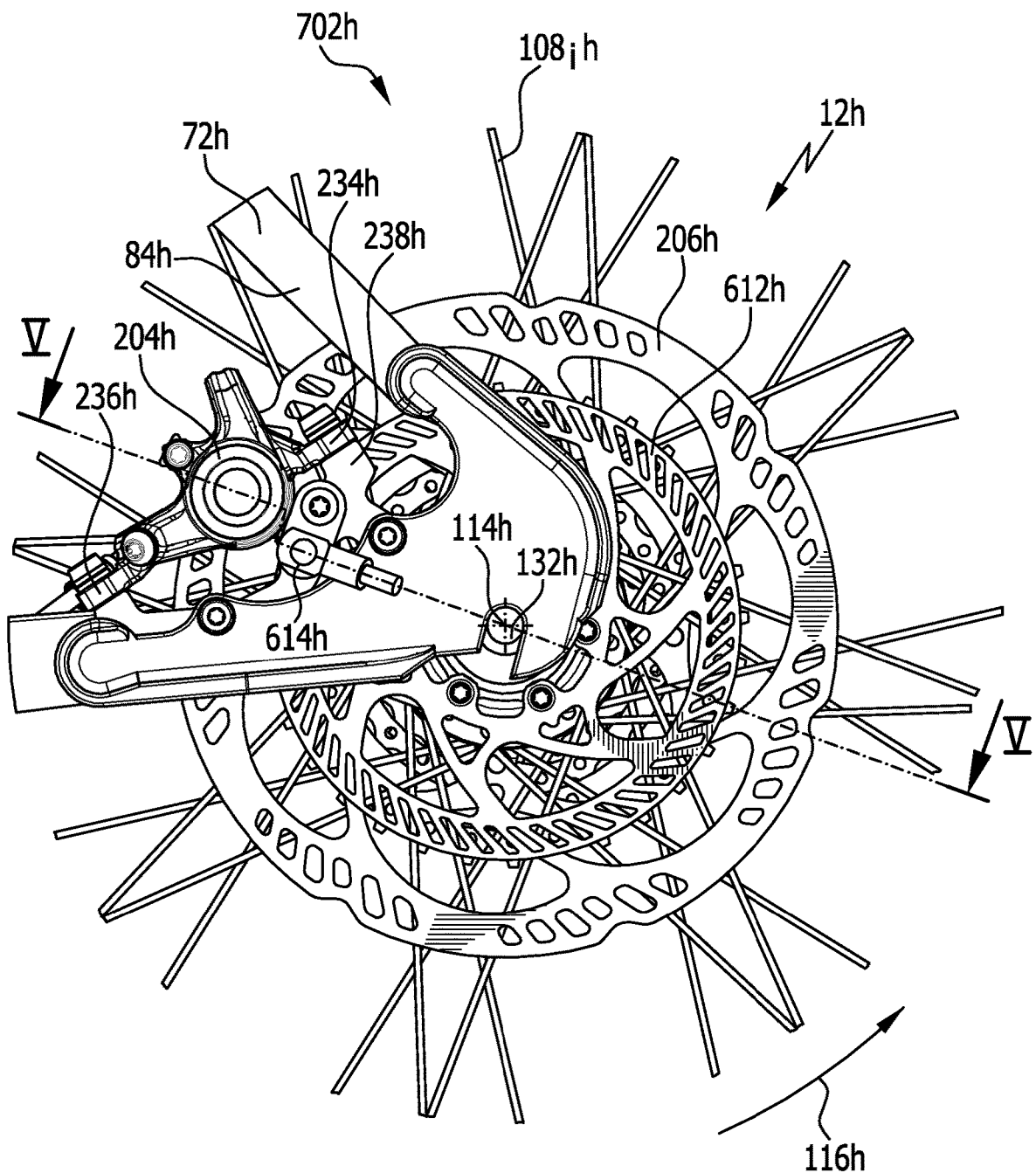
FIG. 4 shows a side view of a detail of a first exemplary embodiment of a rear wheel unit according to the invention for a bicycle.
Figure 5:
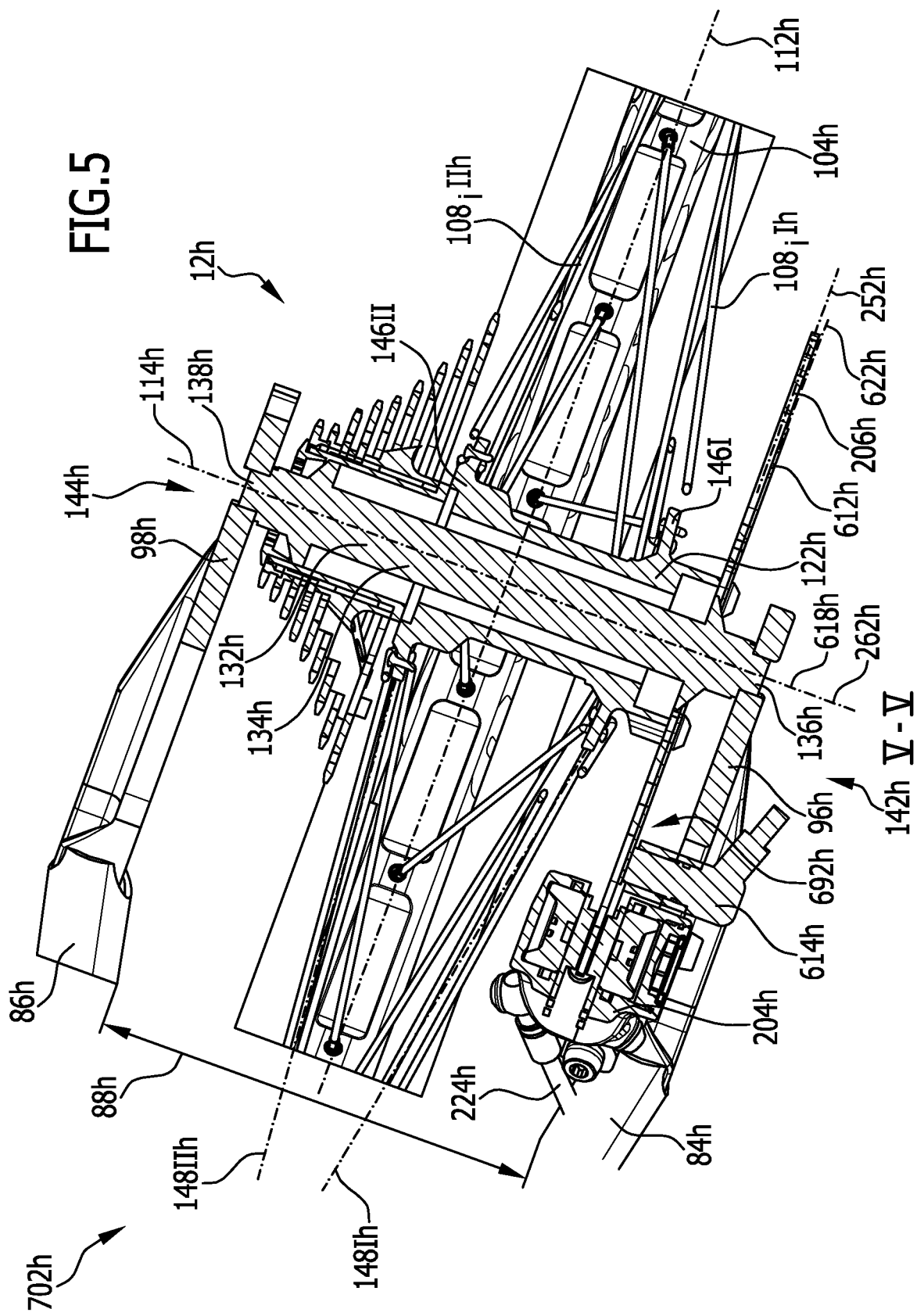
FIG. 5 shows a section V-V according to FIG. 4.

The front wheel unit 12v, which is illustrated in FIGS. 2 and 3, and the rear wheel unit 12h, which is illustrated in FIGS. 4 and 5, are constructed similarly and will be described jointly hereinafter insofar as they are constructed similarly, wherein the specification v and h will be omitted where it is not necessary.

The wheel unit 12 comprises a wheel suspension 72, a wheel 74, which is arranged rotatably on the wheel suspension 72, a braking device 76, which is configured to act in a braking manner on the wheel 74, such that the rotational speed of the wheel 74 under the influence of the braking effect of the braking device 76 becomes slower, and also a sensor unit 78, with which the rotational speed of the wheel 74 is determinable.

The wheel suspension 72 comprises a shaft 82, a first fork leg 84, and a second fork leg 86, wherein the fork legs 84 and 86 are arranged on the shaft 82.

The first fork leg 84 and the second fork leg 86 run substantially parallel to one another and are spaced from one another by a spacing 88, such that the wheel 74 are positionable between the first fork leg 84 and the second fork leg 86.

The shaft 82v of the front wheel unit 12v is arranged here on the head tube 42 in particular so as to be rotatable about a steering axis 92, such that the front wheel unit 12v is steerable by means of a handlebar 94.

The shaft 82h of the rear wheel unit 12h is arranged by way of example on the frame 14, in particular on the rear strut 44.

In the case of the wheel suspension 72, a first dropout 96, which for example is arranged on the first fork leg 84, and a second dropout 98, which for example is arranged on the second fork leg 86, are provided in order to fasten the wheel 74.

The wheel 74 comprises a hub 102, a wheel rim 104 on which an air-filled tyre 106 is fitted, and a plurality of spokes 108, only some of which spokes $108_i$, . . . have been identified by way of example in the Figures, wherein the spokes 108 connect the wheel rim 104 to the hub 102.

Here, the wheel rim 104 runs substantially along a circle which lies in a wheel plane 112 and through the centre point of which a geometric axis of rotation 114 runs, wherein the axis of rotation 114 runs perpendicularly to the wheel plane 112, and the wheel plane 112 in the case of the bicycle 10 illustrated in FIG. 1 coincides with the main plane 32, however the front wheel plane 112v can also run transversely to the main plane 32, since the front wheel 14v is fastened to the rotatable front wheel suspension 72v.

Here, the wheel rim 104, in particular the wheel 74, is arranged rotatably about the axis of rotation 114 in a peripheral direction 116.

Here, the direction of rotation 116 runs substantially in the wheel plane 112 and is always perpendicular to a radial direction of the axis of rotation 114 along a revolution about the axis of rotation 114.

The hub 104 is oriented substantially perpendicularly to the wheel plane 112 and along the axis of rotation 114, as is illustrated in FIGS. 2 to 7, and therefore the hub 102 is arranged in the wheel plane 112 in a manner centred relative to the wheel rim 104, as is illustrated in FIG. 1.

Figure 6:
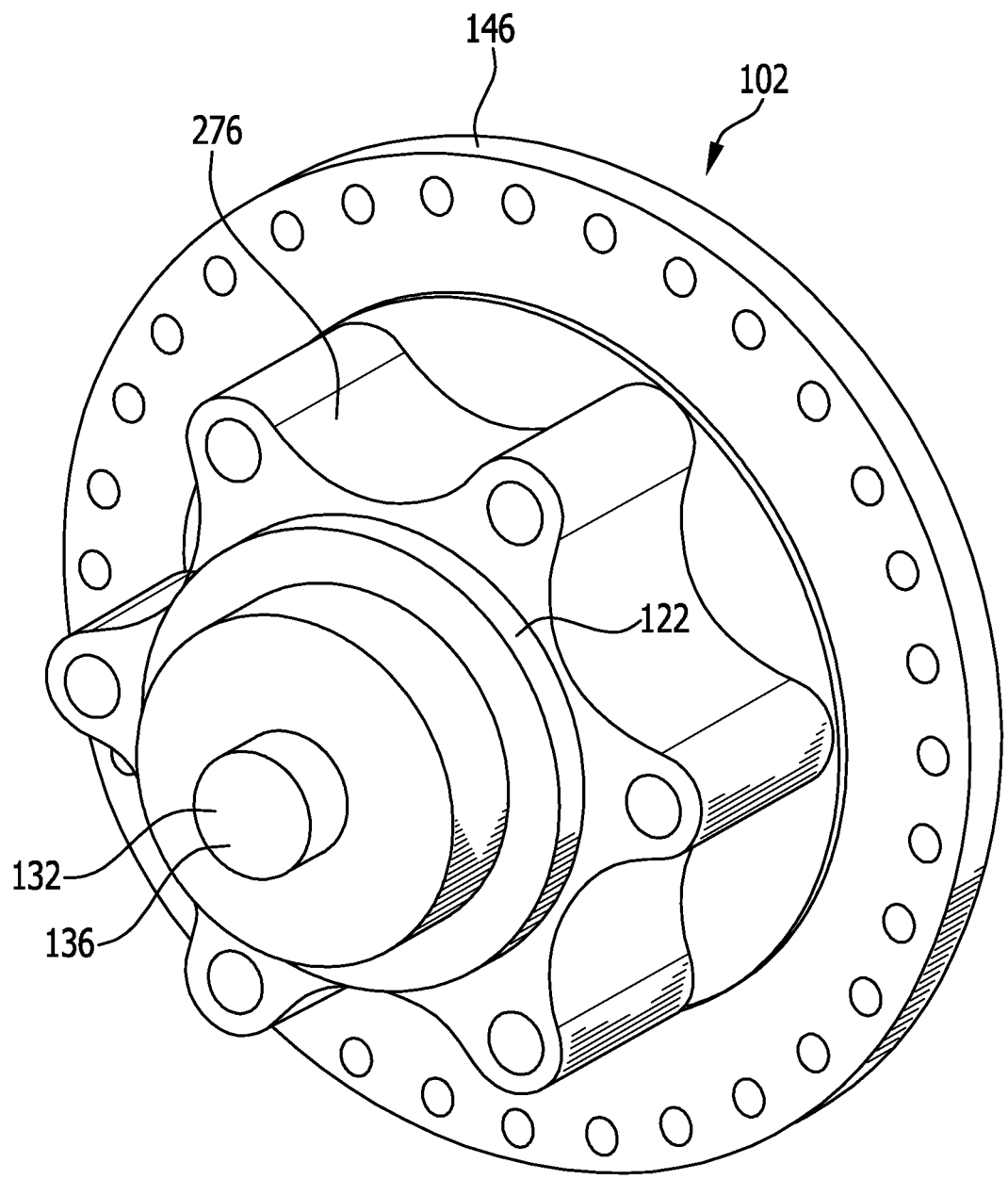
FIG. 6 shows a perspective illustration of a first exemplary embodiment of a hub according to the invention.

The hub 102, which is also illustrated without further component parts in FIG. 6, comprises a hub housing 122 and a wheel axle 132, which is oriented along the axis of rotation 114, wherein the wheel axle 132 is mounted rotatably about the axis of rotation 114 in the hub housing 122. Here, a middle region 134 of the wheel axle 132, which middle region lies between a first end region 136 and a second end region 138 of the wheel axle 132, is rotatably mounted in the hub housing 122, and the first end region 136 and the second end region 138 of the wheel axle 132 protrude out from opposite front sides 142 and 144 of the hub housing 122.

The wheel 74 is fastened to the wheel suspension 72 by means of the wheel axle 132, wherein in particular the first end region 136 of the wheel axle 132 is arranged at the first dropout 96, and the second end region 138 of the wheel axle 132 is arranged at the second dropout 98.

The hub housing 122 comprises a first annular collar 146I and a second annular collar 146II, which are arranged offset in relation to one another along the axis of rotation 114 and are disposed on different sides of the wheel plane 112 at equal distances from the wheel plane 112, such that the first annular collar 146I is positioned between the wheel plane 112 and the front side 142, and the second annular collar 146II is positioned between the wheel plane 112 and the second front side 144. The annular collars 146I and 146II are provided in order to fasten the spokes 108.

Of the spokes 108, some of the spokes 108I are arranged on the first annular collar 146I and the rest of the spokes 108II are arranged on the second annular collar 146II, wherein the number of spokes 108I and the number of spokes 108II corresponds in each case to half the total number of spokes 108.

In the Figures, only some of the spokes $108_i$I, . . . of the spokes 108I and only some of the spokes $108_i$II, . . . of the spokes 108II have been identified by way of example.

Insofar as the configuration and arrangement of the spokes 108I and of the first annular collar 146I and also of the spokes 108II and of the second annular collar 146II are similar, these will be described jointly hereinafter, and the specification I and II will be omitted where possible.

The spokes 108 extend from the annular collar 146, to which they are fastened, to the wheel rim 104, to which they are also fastened, such that the wheel rim 104 is rotatable with the hub housing 122 relative to the wheel axis 132 about the axis of rotation 114.

The spokes 108 here run substantially in a spoke surface 148, wherein the spoke surface 148, in a region of the axis of rotation 114, is spaced from the wheel plane 112, in particular by a spacing by which the annular collar 146 is also spaced from the wheel plane 112, such that the spoke surface 148 runs starting from the annular collar 146, and runs towards the wheel plane 112 in the direction that is radial relative to the axis of rotation 114, and meets the wheel plane 112 in the region of the wheel rim 104, and the spoke surface 148 is rotationally symmetrical with respect to the axis of rotation 114 and is conical.

Here, the first spoke surface 148I and the second spoke surface 148II run substantially mirror-symmetrically with respect to the wheel plane 112, such that the apex-like regions of the conical spoke surfaces 148I and 148II are thus spaced along the axis of rotation 114 and the spoke surfaces 148I and 148II converge towards one another starting from the apex-like regions.

The braking device 76 comprises an actuation unit 202, a brake caliper 204, which in particular is arranged on the wheel suspension 72, and a brake disc 206, which is arranged on the hub 102, in particular on the hub housing 122.

Here, the actuation unit 202, for example a lever, and the brake caliper 204 are connected in a pressure-transmitting manner via a hydraulics system 208, such that the brake caliper 204 is actuated by actuation of the actuation unit 202, whereby the brake caliper 204 cooperates in a braking manner with the brake disc 206 and a rotational movement of the brake disc 206 is thus reduced, and, since the brake disc 206 is arranged on the wheel 74, a rotational speed of a rotational movement of the wheel 74 is thus also reduced.

The hydraulics system 208 comprises a master cylinder 222, which is connected to the brake caliper 204 via a pressure line 224.

The brake caliper 204 comprises a brake caliper housing 232, which is installed, by means of a first support 234 and a second support 236, on the wheel suspension 72, in particular on one of the fork legs 84, 86, for example by means of a brake caliper holder 238.

Figure 7:
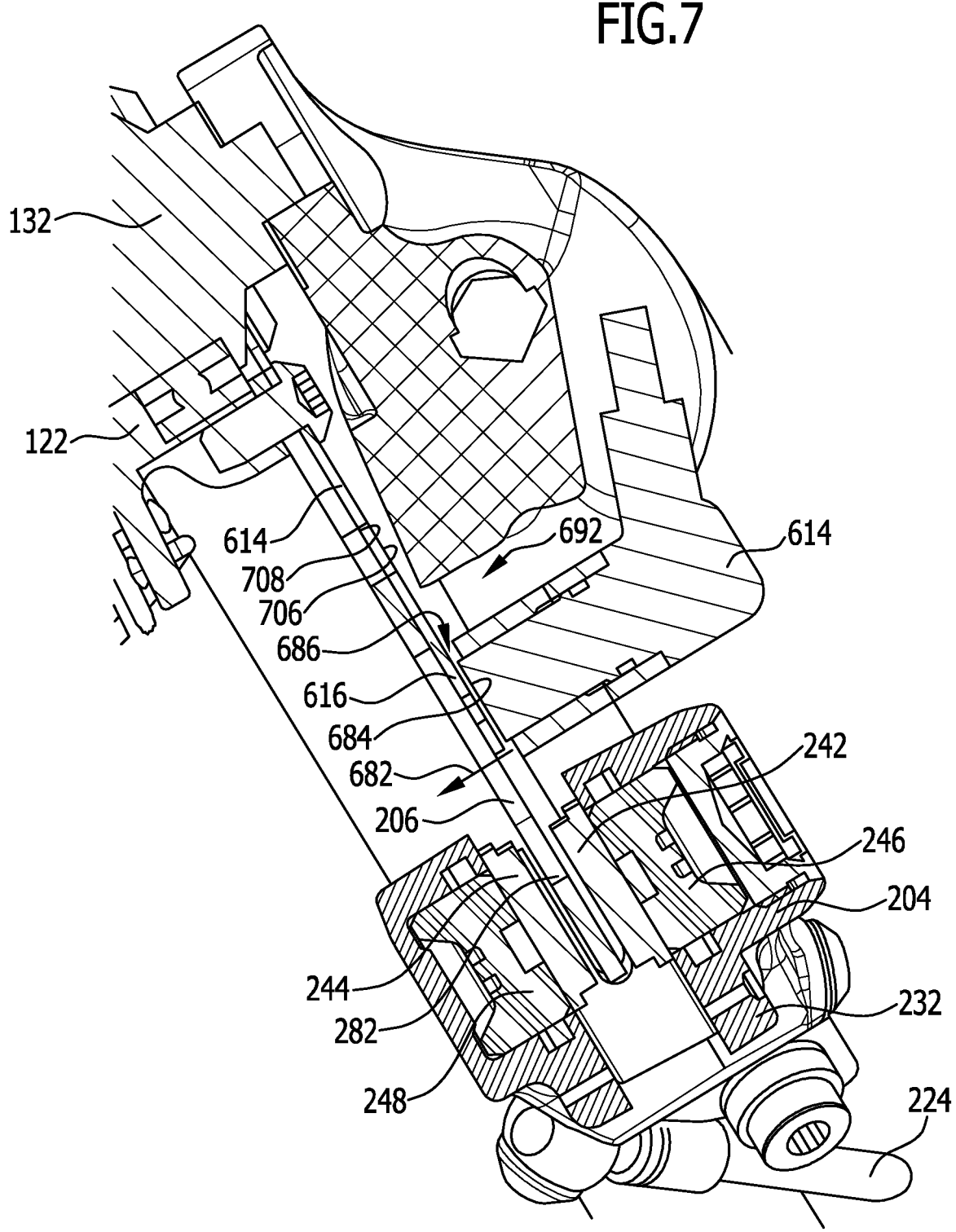
FIG. 7 shows an enlarged illustration of a detail of the section III-III in a region of a first exemplary embodiment of a brake caliper according to the invention.

The brake caliper 204, which is illustrated in an enlarged manner in FIG. 7, additionally comprises a first brake pad 242 and a second brake pad 244, which are arranged movably on the brake caliper housing 232, wherein the brake pads 242 and 244 are arranged at a spacing from one another, such that the brake disc 206 can be positioned between the brake pads 242 and 244.

The first brake pad 242 is acted on by a first piston 246, and the second brake pad 244 is acted on by a second piston 248, wherein the first piston 246 and the second piston 248 are connected to the hydraulics system 208, in particular via the pressure line 242.

Figure 8:
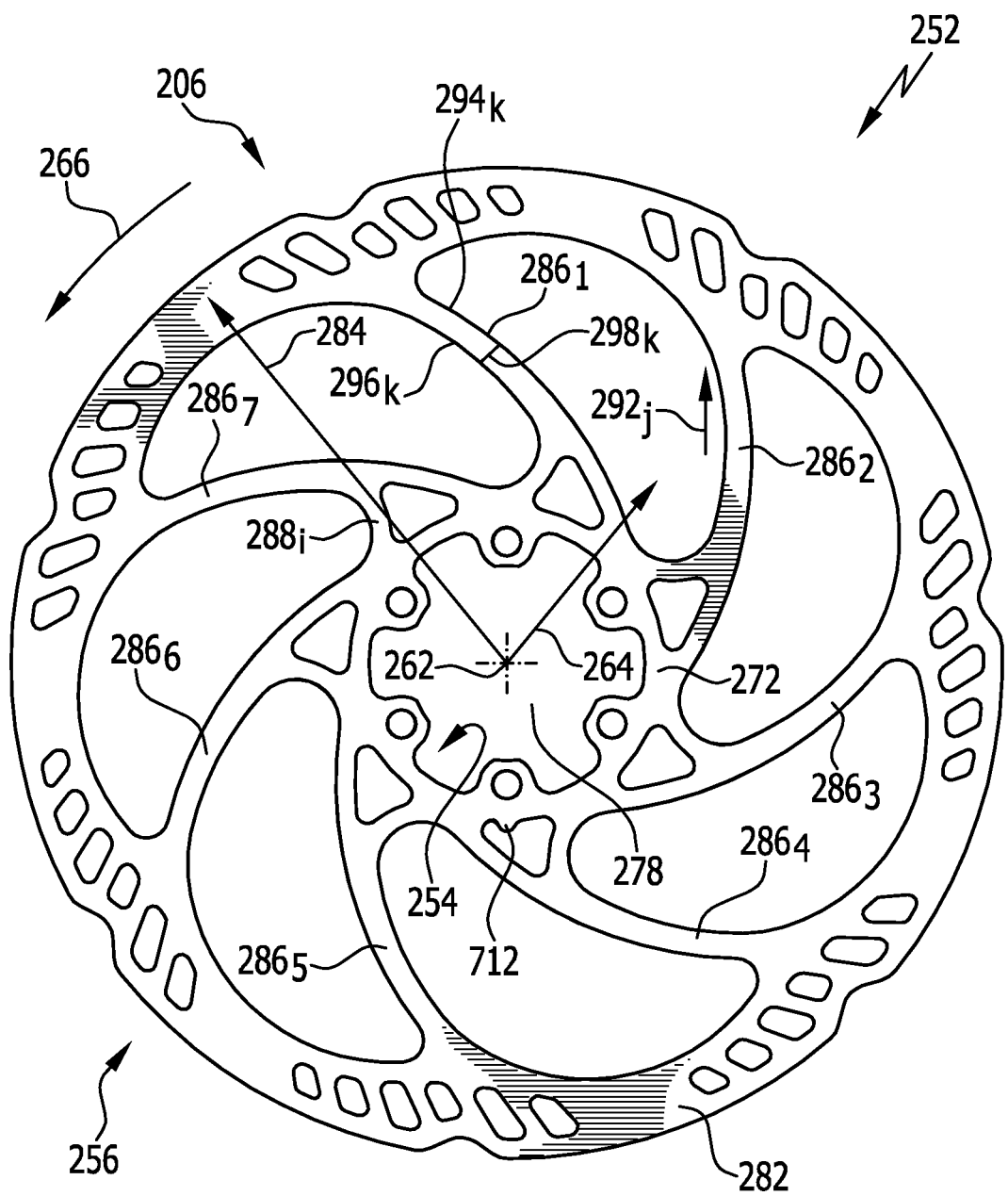
FIG. 8 shows a side view of a first exemplary embodiment of a brake disc according to the invention.

The brake disc 206 extends substantially in a brake disc plane 252, which corresponds to the drawing plane in FIG. 8, from an inner region 254 to an outer region 256, wherein the brake disc 206 extends relative to a brake disc axis 262, which runs substantially perpendicularly to the brake disc plane 252, in a direction 264 that is radial relative to the brake disc axis 262 from the inner region 254 to the outer region 256, and the outer region 256 lies radially outside the inner region 254 in relation to the radial direction 264, and the outer region 256 in the brake disc plane 252 encircles the inner region 254 along a peripheral direction 266 around the brake disc axis 262.

In particular, in the exemplary embodiment, the front brake disc 206v and the rear brake disc 206h are of equal size. Provision is made in a variant so that the brake discs 206v and 206h have different sizes.

A mounting ring 272 is provided in the inner region 254 of the brake disc 206, which mounting ring is mountable by means of a fastening element 274 to the hub 102, in particular to a retaining element 276 of the hub housing 122, which retaining element for example is formed in a manner similar to a flange, such that the brake disc 206 is fixedly connected to the hub housing 122.

For this purpose, the retaining element 276 and the mounting ring 272 in accordance with the exemplary embodiments in FIGS. 6 and 8 each comprise six holes, and the fastening element 274 comprises six connection parts, which are provided one for each hole in the mounting ring 272 and each hole in the retaining element 276, and therefore the mounting ring 272 is connected to the retaining element 276 by means of the connection parts of the fastening element 274.

An axle pass-through opening 278 is arranged in a centred manner in the mounting ring 272, through which opening the wheel axle 132 can pass, wherein the brake disc axis 262 runs through the axle pass-through opening 278.

A brake ring 282, which annularly surrounds the brake disc axis 262 substantially with a radius 284, is arranged in the outer region 256 of the brake disc 206, and the brake pads 242 and 244 act on the brake ring 282 in the event of a braking operation.

The mounting ring 272 and the brake ring 282 are connected to one another by supporting bars 286, wherein for example the supporting bars 286 are supported on the mounting ring 272 by means of auxiliary supporting bars 288.

Here, only some supporting bars $286_i$, ... of the supporting bars 286 have been identified in the Figures, and only some of the auxiliary supporting bars $288_i$, ... of the auxiliary supporting bars 288 have been identified.

In the embodiment according to FIG. 8, N=7 supporting bars $286_1$ to $286_7$ are provided.

Here, the supporting bars 286 are elongate and extend from the inner region 254 to the outer region 256 of the brake disc 206, for example the supporting bars 286 extend in an arcuate manner.

Each individual supporting bar $286_i$ of the supporting bars 286 extends in an elongate manner from the inner region 254 to the outer region 256 in a direction of extent $292_i$, wherein the direction of extent $292_i$ runs at an incline to the direction 264 that is radial relative to the brake disc axis 262.

Each supporting bar $286_i$ of the supporting bars 286 extends transversely to its direction of extent $292_i$ from a first edge $294_i$ to a second edge $296_i$, wherein a spacing between the edges $294_i$ and $296_i$ constitutes a width $298_i$ of the supporting bar $286_i$, and the width $298_i$, in relation to a direction running transversely to the radial direction 264, is measured in particular substantially in the peripheral direction 266 running peripherally around the brake disc axis 262.

In the Figures, only some edges $294_i$, ... and $296_i$, ... of the edges 294 and 296 have been identified.

In the exemplary embodiment, the widths $298_i$ of the supporting bars $286_i$ corresponding to a width 298 are of equal size. In a variant, provision is made that the widths $298_i$, ... have different sizes.

In particular, the supporting bars 286 are arranged periodically in the direction of the peripheral direction 266, by way of example the arrangement of the supporting bars 286 is n-rotationally symmetrical with respect to the brake disc axis 262, i.e. the arrangement of the bars 286 is symmetrical with respect to a rotation about the brake disc axis 262 with an angle of 360°/n, wherein n is a natural number and in the exemplary embodiment corresponds to the number N of the supporting bars 286.

The braking device 76 thus functions as follows.

The actuation unit 202 acts, for example by means of the lever, on the master cylinder 222 of the hydraulics system 208, whereby the master cylinder 222 generates an increase in pressure in the hydraulics system 208, which is transferred through the pressure line 224 to the brake caliper 204 by means of a hydraulic fluid, whereby the brake caliper 204 is actuated.

Here, in the brake caliper 204, the increased pressure in the hydraulics system 208 is converted into a mechanical movement of the pistons 246 and 248, whereby the first piston 246 acts on the first brake pad 242 and the second piston 248 acts on the second brake pad 244, and the first brake pad 242 and the second brake pad 244 are thus moved towards one another, such that the brake ring 282 positioned between the first brake pad 242 and the second brake pad 244, which brake ring rotates as the bicycle 10 moves, is acted on from one side by the first brake pad 242 and from the other side by the second brake pad 244, and the rotational speed of the brake ring 282 and consequently also the rotational speed of the wheel 74 connected to the brake ring 282 is reduced on account of the resultant friction.

The sensor unit 78 comprises a sensor ring 612, which is arranged on the wheel 74, and a sensor 614, which is aligned with a sensing region 616 of the sensor ring 612 and detects this sensing region 616, in particular detects a relative movement of the sensing region 616 relative to the sensor 614.

Figure 9:
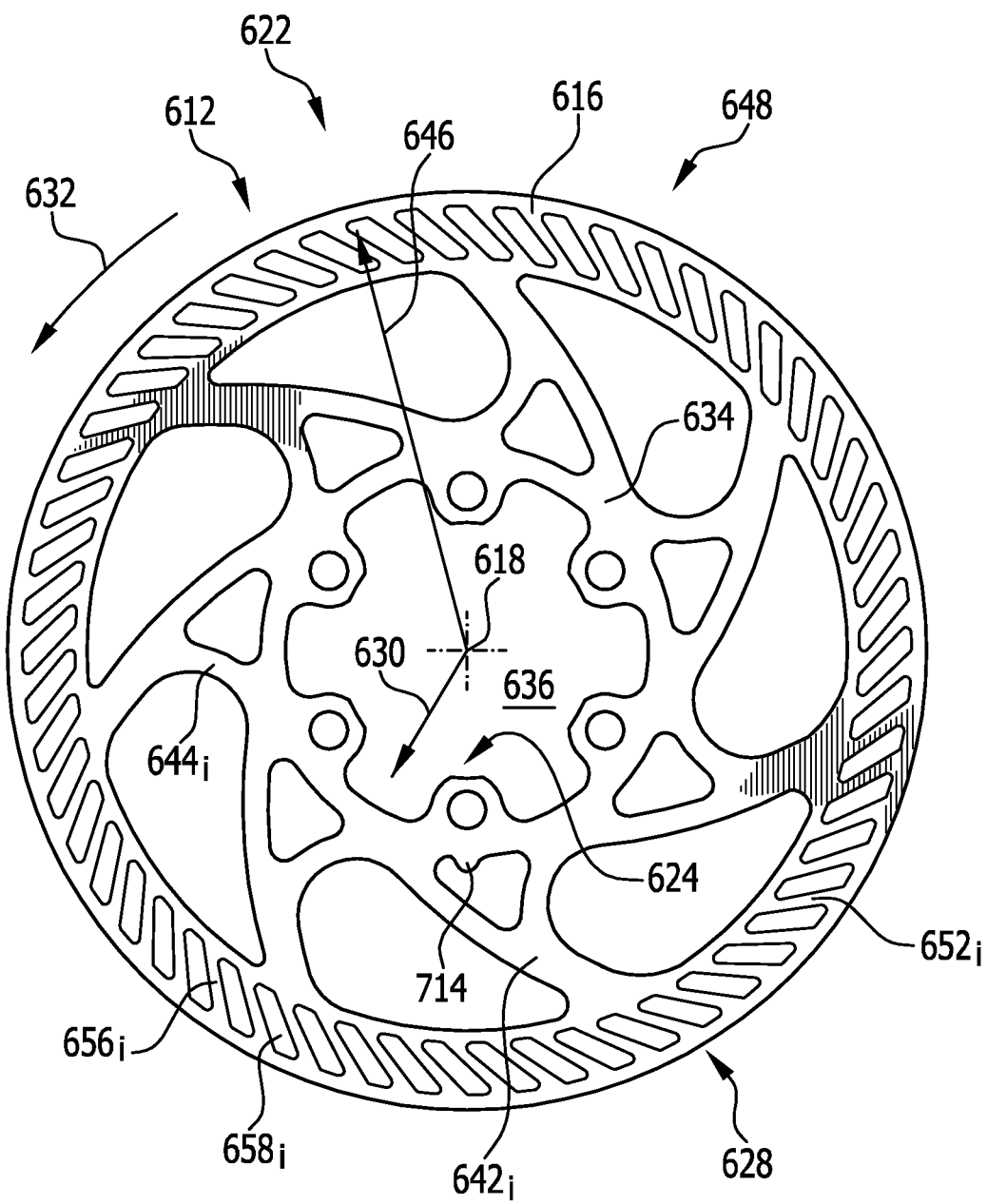
FIG. 9 shows a side view of a first exemplary embodiment of a sensor ring according to the invention.
Figure 10:
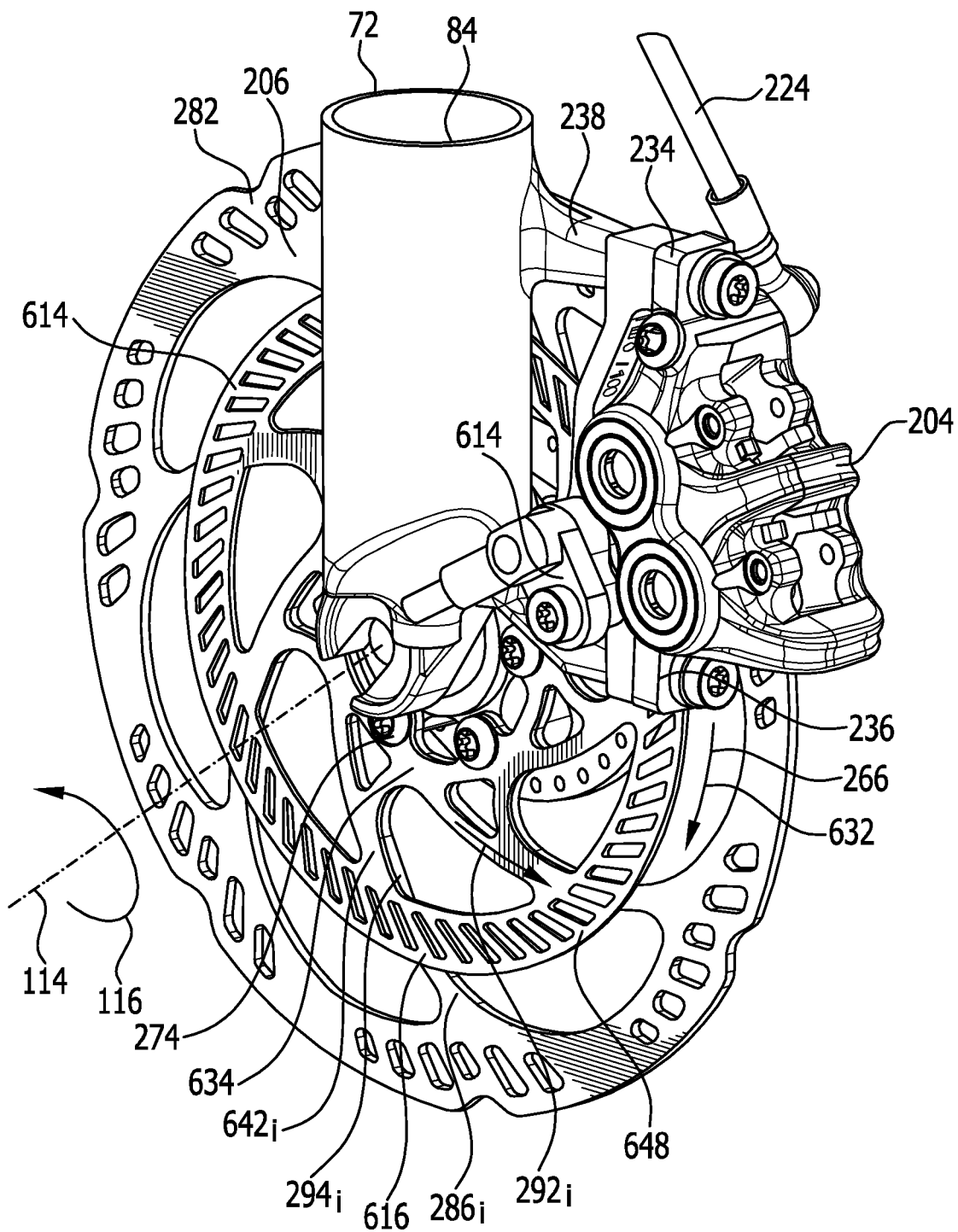
FIG. 10 shows an oblique view of the first exemplary embodiment of a brake disc and of a sensor ring, which are mounted in a mounting position on the hub.
Figure 11:
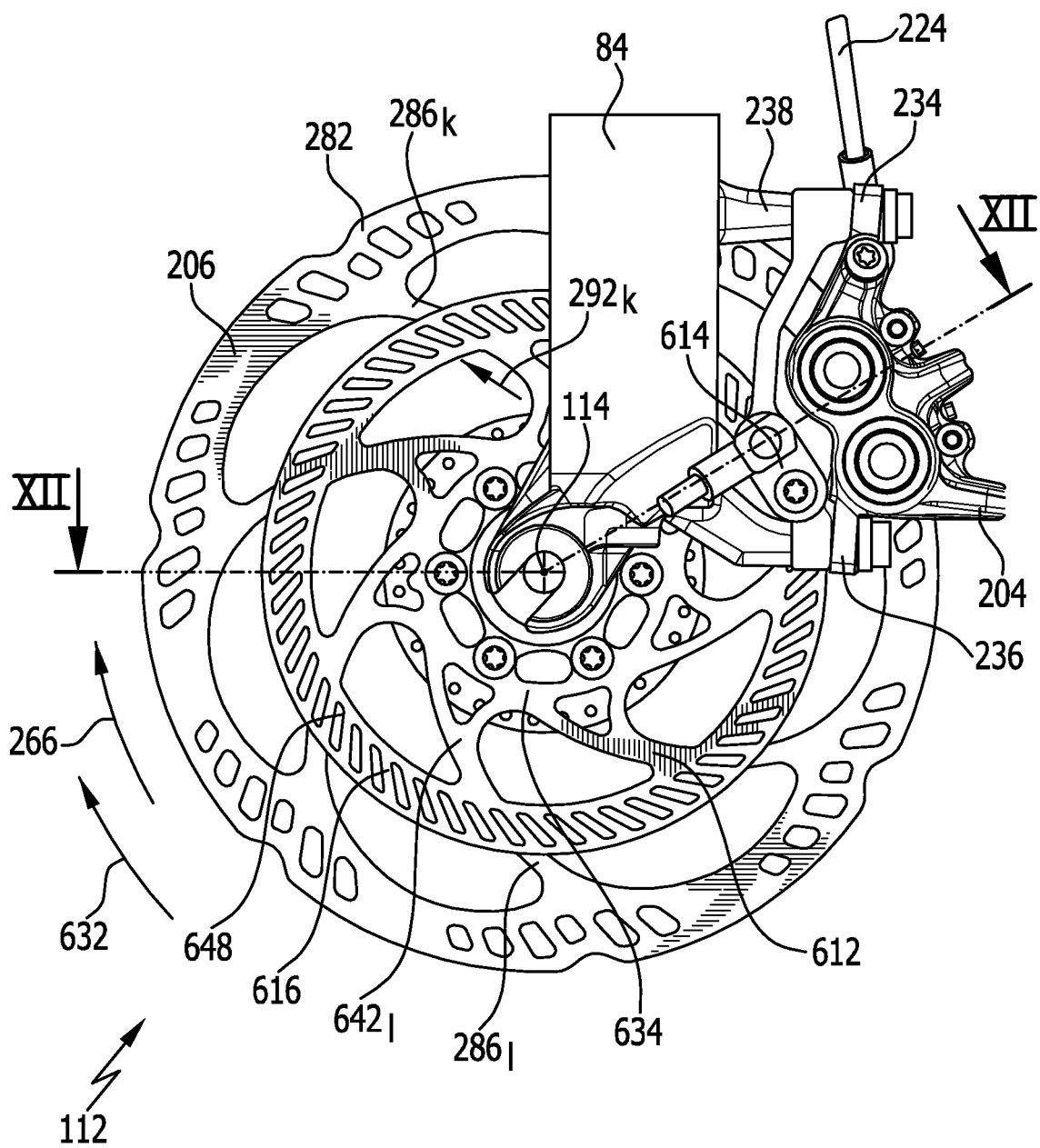
FIG. 11 shows a side view of the illustration according to FIG. 10.
Figure 12:
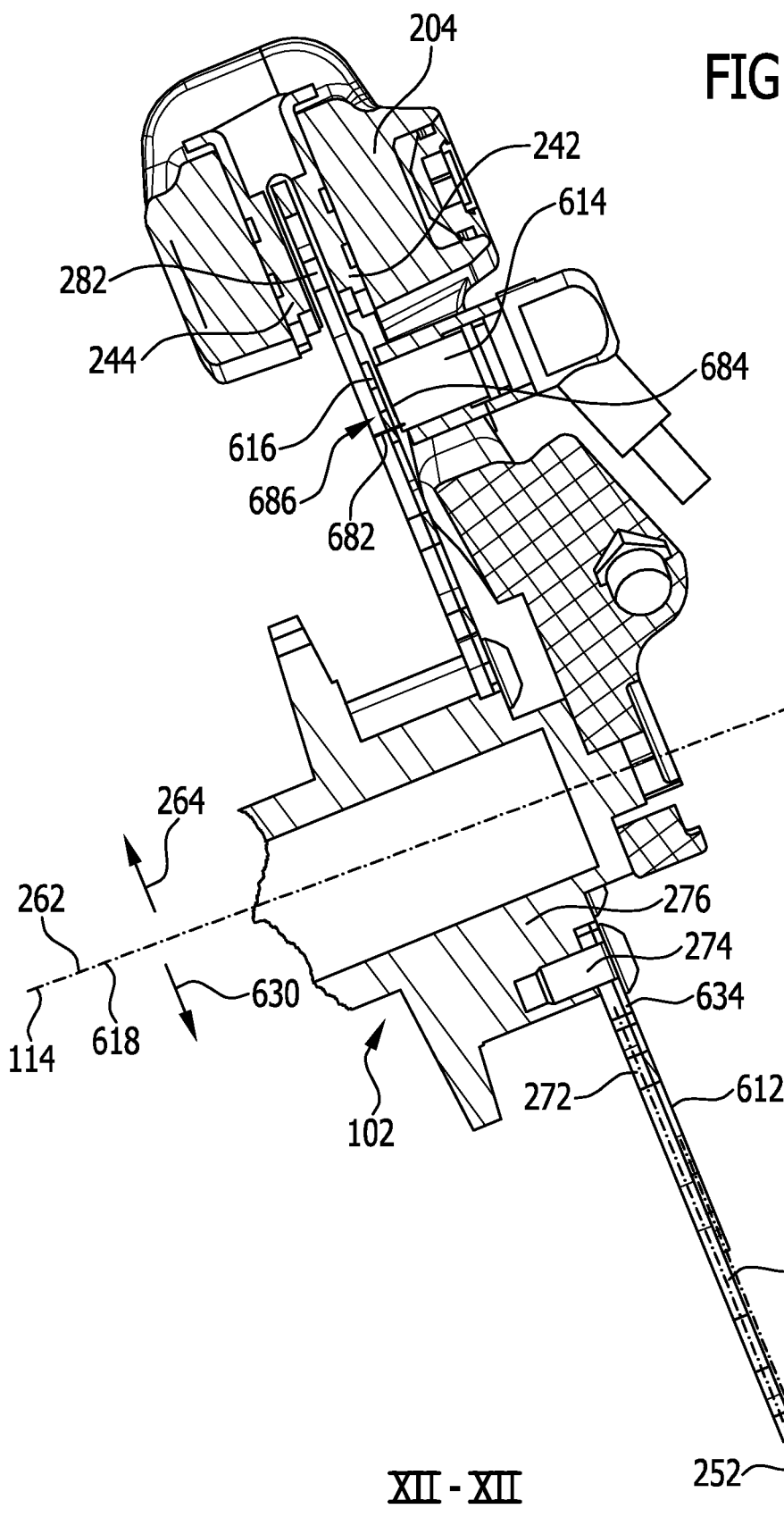
FIG. 12 shows a section XII-XII according to FIG. 11.
Figure 13:
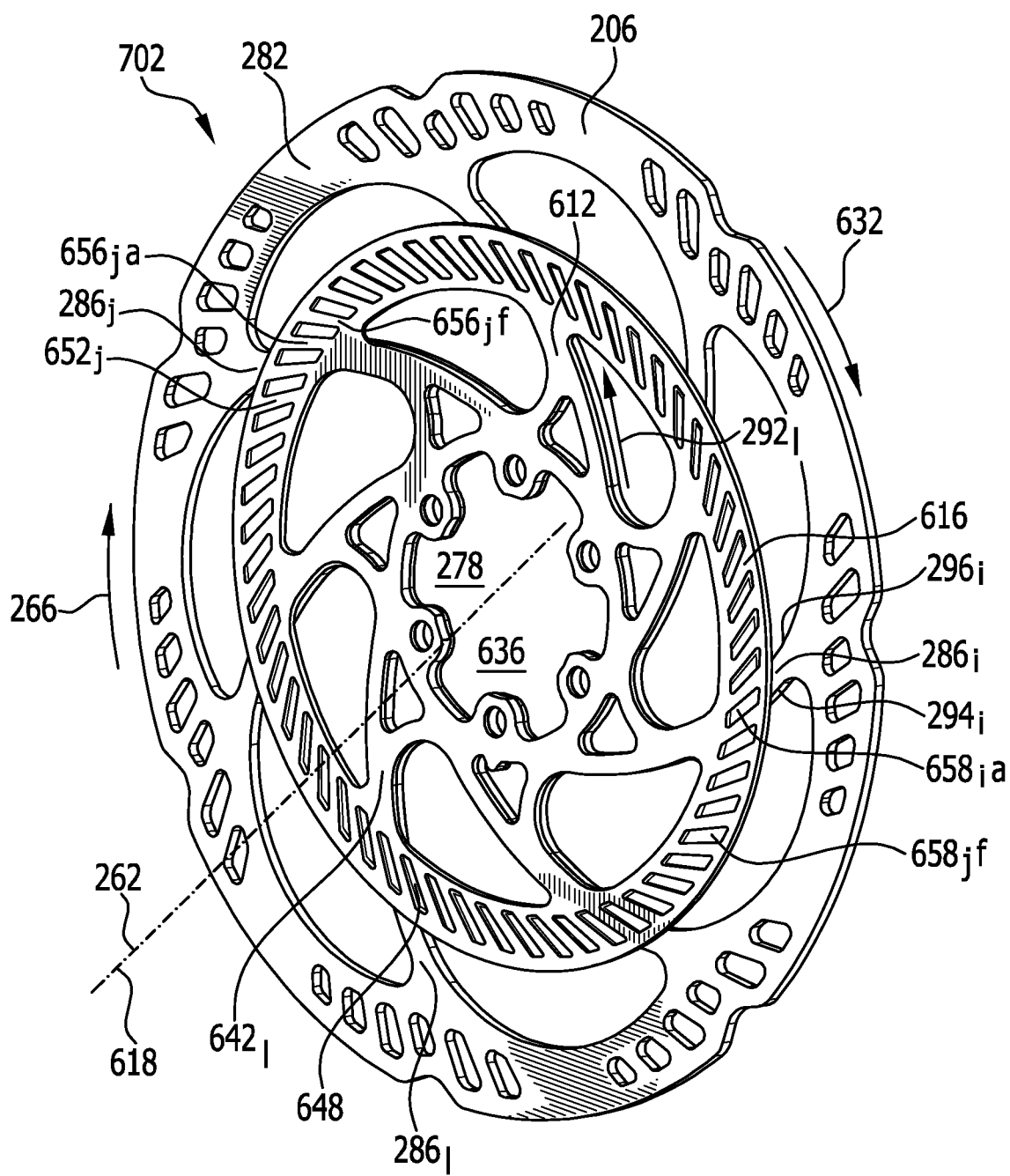
FIG. 13 shows an oblique view of the first exemplary embodiment of a brake disc according to the invention and of a sensor ring according to the invention in the mounting position.

The sensor ring 612 in accordance with the exemplary embodiment illustrated in FIG. 9 extends substantially in a sensor ring plane 622 running perpendicularly to a sensor ring axis 618, wherein in FIG. 9 the sensor ring plane 622 corresponds substantially to the drawing plane, and the sensor ring axis 618 runs perpendicularly to the drawing plane, and extends in the sensor ring plane 622 from an inner region 624 to an outer region 628, wherein the inner region 624 lies radially inwardly relative to the outer region 628 in relation to a direction 630 that is radial relative to the sensor ring axis 618, and wherein the inner region 624 and the outer region 628 surround the sensor ring axis 618 in a peripheral direction 632, such that in particular the outer region 628 encircles the inner region 624 along the peripheral direction 632 around the sensor ring axis 618 in the sensor ring plane 622.

Here, in this exemplary embodiment, the sensor ring 612 is substantially planar, such that in particular the inner region 624 and the outer region 628 of the sensor ring 612 are arranged substantially in the sensor ring axis 618.

A mounting ring 634 is arranged in the inner region 624 of the sensor ring 612, by means of which mounting ring the sensor ring 612 is mountable on the hub 102.

In the embodiment according to FIG. 9, the mounting ring 634 is formed similarly to the mounting ring 272 of the brake disc 206, and therefore reference can be made fully to the explanations provided for the latter.

An axle pass-through opening 636 is arranged in the inner region 624 of the sensor ring 612, wherein the sensor ring axis 618 runs through the axle pass-through opening 636 and in particular the axle pass-through opening is substantially circular and is arranged in a centred manner relative to the sensor ring axis 618.

Here, the mounting ring 634 surrounds the axle pass-through opening 636 in the sensor ring plane 622 along the peripheral direction 632 around the sensor ring axis 618.

The inner region 624 of the sensor ring 612, in particular of the mounting ring 634, and the outer region of the sensor ring 612, for example the sensing region 616 of the sensor ring 612, are held by means of retaining bars 642.

Here, only some retaining bars $642_i$, ... of the retaining bars 642 have been identified in the Figures.

By way of example, the retaining bars 642 run arcuately from the inner region 624 to the outer region 628.

The retaining bars 642 extend in an elongate manner and at an incline to the direction that is radial relative to the sensor ring axis 618.

In particular, the retaining bars 642, in respect of their elongate extent, in particular in respect of the extent transversely to the direction that is radial relative to the sensor ring axis 618, are slightly shorter than the supporting bars 286 of the brake disc 206 in respect of the elongate extent thereof.

Here, the retaining bars 642 are formed substantially similarly to the supporting bars 286 of the brake disc 206, in particular in respect of their orientation relative to the direction that is radial relative to the sensor ring axis 618 or the brake disc axis 262, in respect of their width transversely to the direction that is radial relative to the axis 618 or 262, and in respect of the curvature of the arcuate construction.

Here, in the exemplary embodiment, there are just as many retaining bars 642 provided with the sensor ring 612 as there are supporting bars 286 provided with the brake disc 206.

The retaining bars 642 are arranged in a rotationally symmetrical manner with respect to the sensor ring axis 618, i.e. the arrangement of the retaining bars 642 is symmetrical with respect to a rotation with an angle of 360°/h about the sensor ring axis 618, wherein h is a natural number and in the exemplary embodiment h corresponds to the number of retaining bars 642.

In addition, the retaining bars 642 are additionally supported on the mounting ring 634 by means of auxiliary retaining bars 644, wherein there is an auxiliary retaining bar 644 provided for each one of the retaining bars 642.

Only individual auxiliary retaining bars $644_i$, ... of the auxiliary retaining bars 644 have been identified in the drawings.

The sensing region 616 of the sensor ring 612 is arranged in the outer region 628, wherein the sensing region 616 is formed substantially annularly around the sensor ring axis 618 with a radius 646, and the annular sensing region 616 is substantially centred with respect to the sensor ring axis 618. Here, the radius 646 of the sensing region 616 is smaller than the radius 284 of the brake ring 282.

The sensing region 616 has a periodically varying structure 648, wherein the periodically varying structure 648 periodically varies in terms of its properties along the peripheral direction 632 around the sensor ring axis 618.

Here, the periodically varying structure 648 is m-rotationally symmetrical with respect to the sensor ring axis 618, i.e. the periodically varying structure 648 is symmetrical with respect to a rotation by an angle of 360°/m, wherein m corresponds to the number N of supporting bars 286 of the brake disc 206 or an integer multiple thereof, wherein m=56 in the exemplary embodiment and therefore corresponds to 8 times the number N of supporting bars 286.

In the exemplary embodiment the periodically varying structure 648 is formed as a toothed structure, wherein the toothed structure runs preferably along the peripheral direction 632 around the sensor ring axis 618 in the sensing region 616.

Here, the toothed structure is formed by teeth 652, which run substantially in the sensor ring plane 622 and in particular run at an incline to the direction that is radial relative to the sensor ring axis 618, in particular the orientation of the teeth 652 being similar to the orientation of the supporting bars 286 of the brake disc 206 with respect to the direction 264 that is radial relative to the brake disc axis 262.

Here, only some of the teeth $652_i$, ... of the teeth 652 have been identified in the Figures.

Here, the teeth 652 are formed in an elongate manner along a direction of extent which is oriented at an incline in relation to the direction that is radial relative to the sensor ring axis 618.

The teeth 652 are formed by material bridges 656, wherein an aperture 658 is arranged between each of the material bridges 656.

Here, only some of the apertures $658_i$, ... of the apertures 658 have been identified in the Figures, and only some of the material bridges $656_i$, ... of the material bridges 656 have been identified.

Here, the material bridges 656 and the apertures 658 are arranged in a periodically alternating manner along the peripheral direction 632 around the sensor ring axis 618 and thus form a rotationally-symmetrical arrangement with respect to the sensor ring axis 618 and an angle that is smaller than 360°.

The number M of the apertures 658 corresponds substantially to the periodicity of the toothed structure, such that the number M of apertures corresponds to m or an integer multiple of m, wherein the toothed structure is m-rotationally symmetrical and in the exemplary embodiment M=56 and M=m.

The material bridges 656 are substantially identically shaped and are arranged transversely to the peripheral direction 632 and run at an incline to the direction that is radial relative to the sensor ring axis 618 and are therefore oriented in particular similarly to the way in which the supporting bars 286 of the brake disc 206 are oriented in relation to the direction 264 that is radial relative to the brake disc axis 262.

The apertures 658 extend at an incline to the direction that is radial relative to the sensor ring axis 618 and run transversely to the peripheral direction 632 and are oriented here similarly to the material bridges 656.

The apertures 658 have a width transversely to their elongate extent, i.e. in particular substantially in the direction of the peripheral direction 632, which is smaller than the width 298 of the supporting bars 286 of the brake disc 206.

The material bridges 656 are constructed to heavily influence a magnetic field, for example are made of a material that heavily influences a magnetic field.

The periodically varying sequence of one of the material bridges 656, which heavily influences a magnetic field, and one of the apertures 658, which at most influences a magnetic field only weakly, thus forms a structure that influences a magnetic field to differing degrees in a periodically varying manner, wherein the degree to which a magnetic field is influenced changes suddenly in the event of a transition from one of the material bridges 656 to one of the apertures 658.

Here, in the exemplary embodiment, the structure that influences a magnetic field to differing degrees in a periodically varying manner has the same periodicity as the toothed structure along the peripheral direction 632 around the sensor ring axis 618.

The sensor 614 detects the periodically varying structure 648 of the sensing region 616, and in particular the sensor 614 detects the material bridges 656 and the apertures 658, for example the transitions from the material bridges 656 to the apertures 658.

In the exemplary embodiment the sensor 614 is formed by way of example as a magnetic sensor, such that the structure of the sensing region 616 influencing a magnetic field to differing degrees in a periodically varying manner triggers a periodically varying signal in the event of a relative movement of said sensing region relative to the sensor 614.

By way of example, the sensor 614 is formed as a Hall sensor, such that different areas of the structure of the sensing region 616 influencing a magnetic field to differing degrees, in particular the arrangement of the alternately arranged material bridges 656 and apertures 658, generate a Hall voltage of differing magnitude in the sensor 614, and therefore the sensor 614 detects the periodically varying structure 648.

In a variant, the sensor 614 generates a magnetic field and detects how this magnetic field is influenced by magnetic-field-influencing structures which are arranged at a distance from the sensor 614, but not beyond a range 682 of said sensor.

Here, the sensor 614 comprises in particular a sensor surface 684, which is followed by a detection region 686, which lies outside the sensor 614 and extends substantially not beyond the range 682 starting from the sensor surface 684, wherein the sensor 614 detects magnetic-field-influencing structures within the detection region 686.

If, by way of example, an electric current flows through the sensor surface 684, wherein, on account of the Hall effect in the event of a magnetic field passing through the sensor surface 684, for example a magnetic field of differing strength on account of the structure influencing a magnetic field to differing degrees in a periodically varying manner, in particular the alternately arranged material bridges 656 and apertures 658, a Hall voltage is formed perpendicularly to a direction of flow of the electric current, and the sensor 614 detects the periodically varying structure 648, in particular the material bridges 656 and the apertures 658, by analysing this Hall voltage, the magnitude of which is dependent on the position of the structure influencing a magnetic field to differing degrees in a periodically varying manner relative to the sensor 614.

The sensor 614 is arranged in a sensor region 692 of the wheel unit 12, for example on the brake caliper holder 238.

In a mounting position 702, the brake disc 206 and the sensor ring 612 are arranged adjacent to one another, and in the exemplary embodiment according to FIGS. 10 to 17 the brake disc 206 and the sensor ring 612 are directly adjacent to one another, and the brake disc axis 262 and the sensor ring axis 618 coincide with the axis of rotation 114.

The axle pass-through openings 278 and 636 in the brake disc 206 and the sensor ring 612 are thus aligned with one another and form a common axle pass-through opening.

The sensor 614 is arranged close to the sensing region 616, such that an area of the sensing region 616 is not distanced from the sensor 614 further than the range 682 of the sensor 614, and therefore this area of the sensing region 616 lies within the detection region 686 of the sensor 614.

The sensor region 692 is thus aligned with a sensor side 706 of the sensor ring 612, the sensor side 706 facing the sensor 614 in the mounting position 702, and the brake disc 702, in the mounting position 702, is arranged adjacent to a covering side 708 of the sensor ring 612, which is opposite the sensor side 706.

In the mounting position 702, the sensing region 616 of the sensor ring 612 is adjacent to the supporting bars 286 of the brake disc 206, as is illustrated in FIGS. 13 to 17, and in particular the sensing region 616 is supported on the supporting bars 286.

The brake disc 206 and the sensor ring 612 are mounted on the hub 102 in the mounting position 702, wherein by way of example the brake disc 206 has a mounting mark 712 and the sensor ring 612 has a mounting mark 714 for marking the positions of said two parts relative to one another in the mounting position 702, wherein the mounting marks 714 and 712 are formed in the exemplary embodiment as tooth-like protrusions.

The brake disc 206 and the sensor ring 612 are formed in such a way that in the mounting position 702 each of the supporting bars 286 of the brake disc 206 fully covers a determinable number of apertures 658, and in the exemplary embodiment each of the supporting bars 286 fully covers one of the apertures 658.

Figure 14:
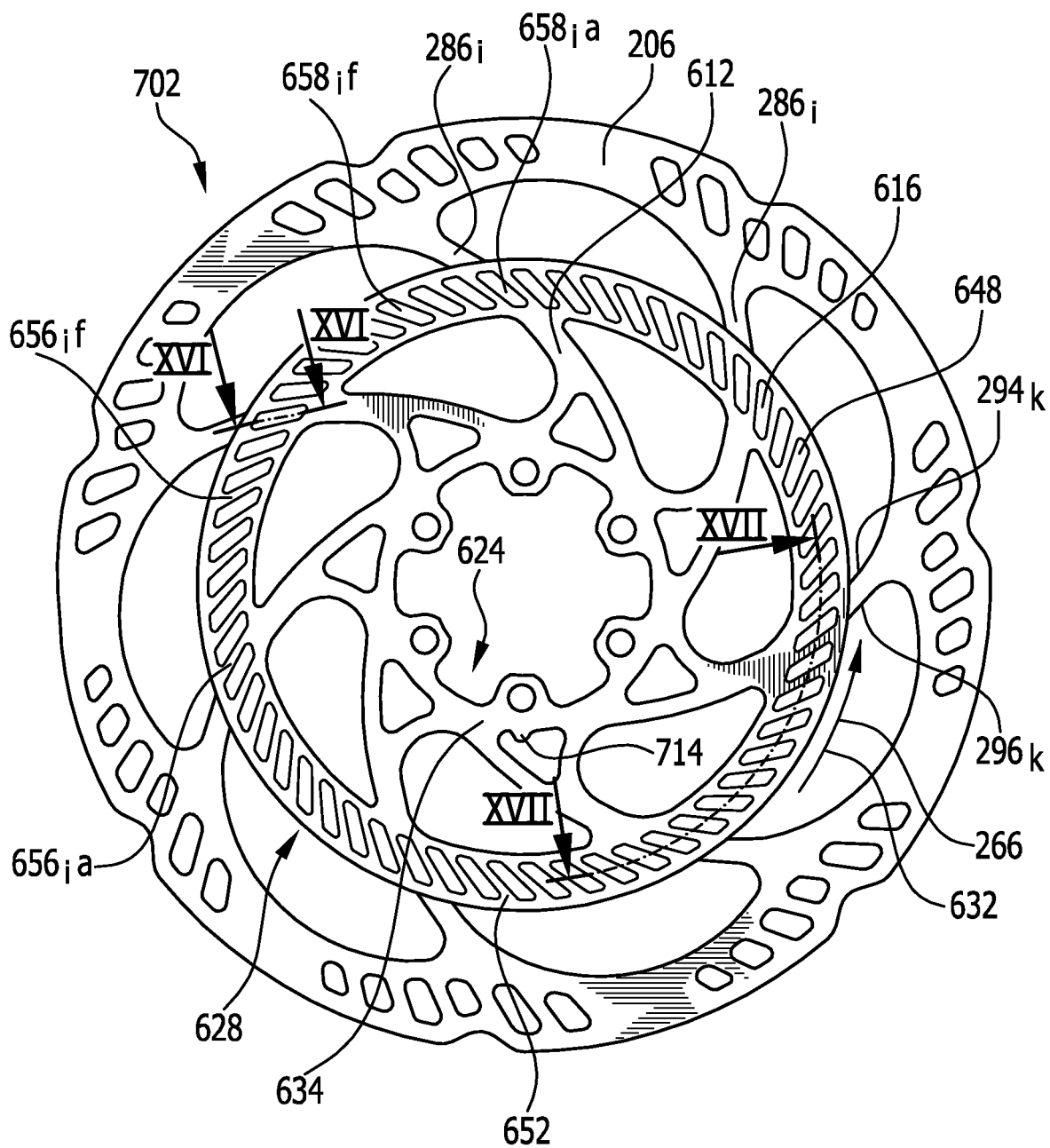
FIG. 14 shows a side view of the first exemplary embodiment of a brake disc according to the invention and of a sensor ring according to the invention in the mounting position.
Figure 15:
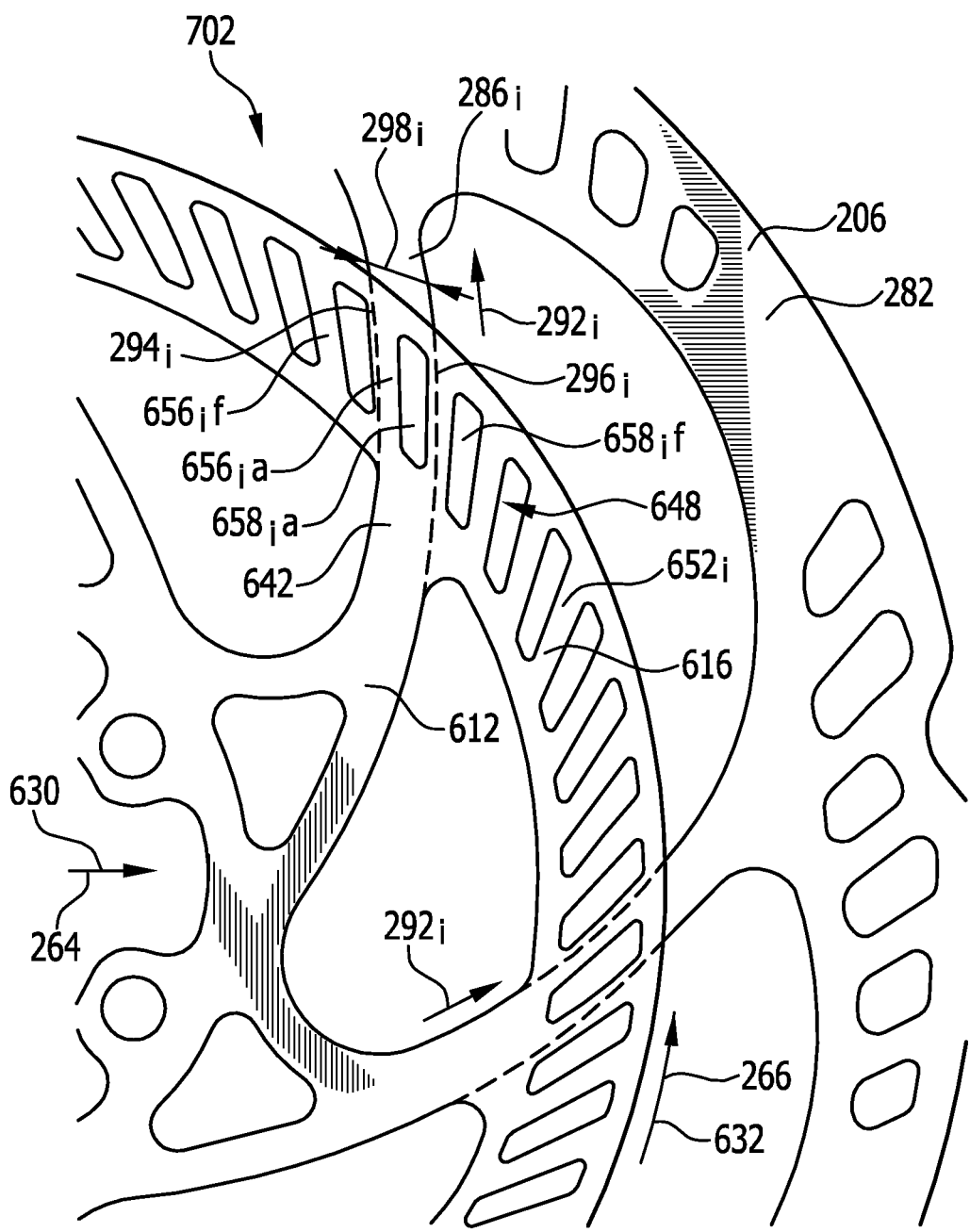
FIG. 15 shows a detail of an enlarged illustration according to FIG. 14.
Figure 16:
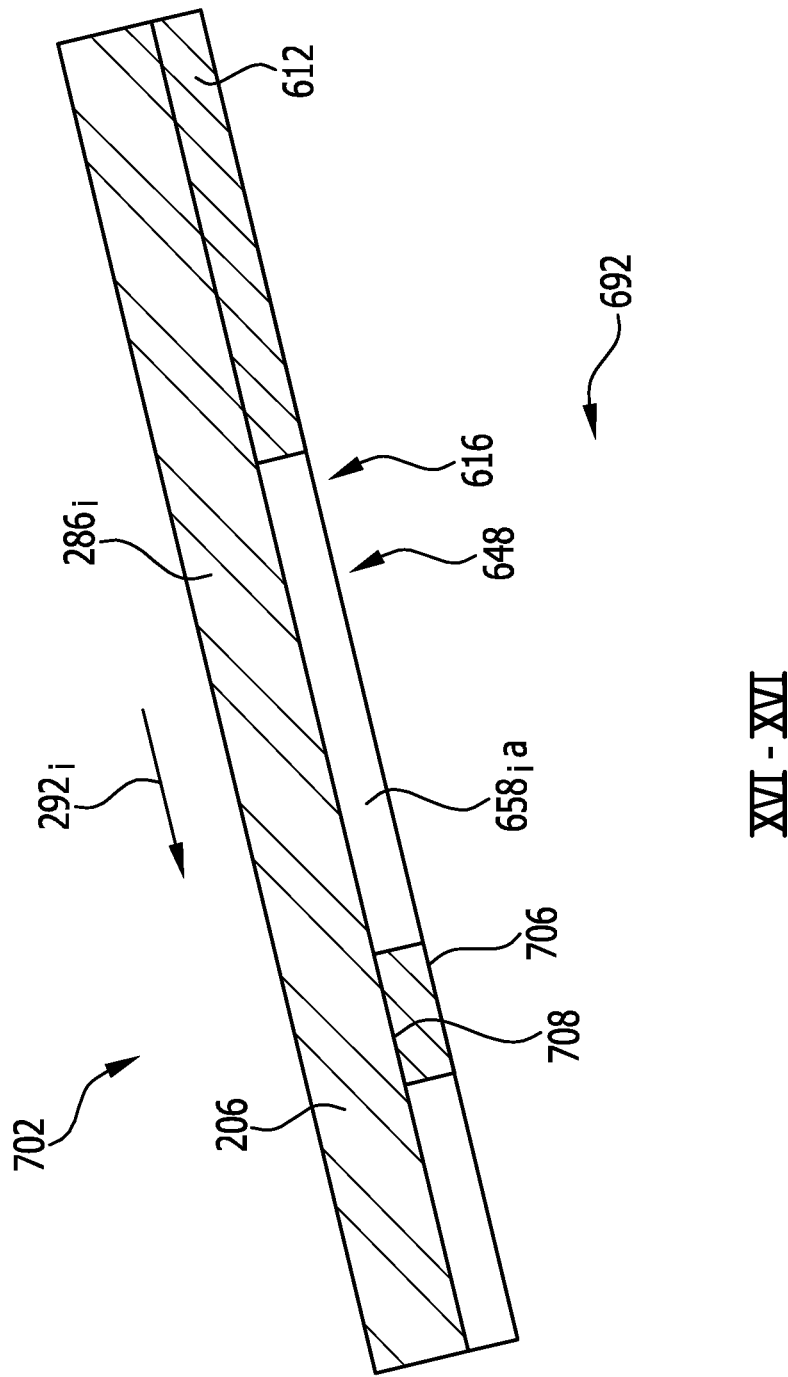
FIG. 16 shows a section XVI-XVI according to FIG. 14 through the first exemplary embodiment of a brake disc and of a sensor ring in the mounting position, which runs through a covered aperture.

Each of the first edges 294 of each of the supporting bars 286 is thus adjacent to one of the material bridges 656 of the sensor ring 612 and each of the second edges 296 of each of the supporting bars 286 is also adjacent to one of the material bridges 656 of the sensor ring 612, as is illustrated in FIGS. 14 and 15.

Each of the edges 294 and 296 of each of the supporting bars 286 thus runs in such a way that in the mounting position 702 the edges 294 and 296 are in each case covered in the sensing region 616 by one of the material bridges 656.

Figure 17:
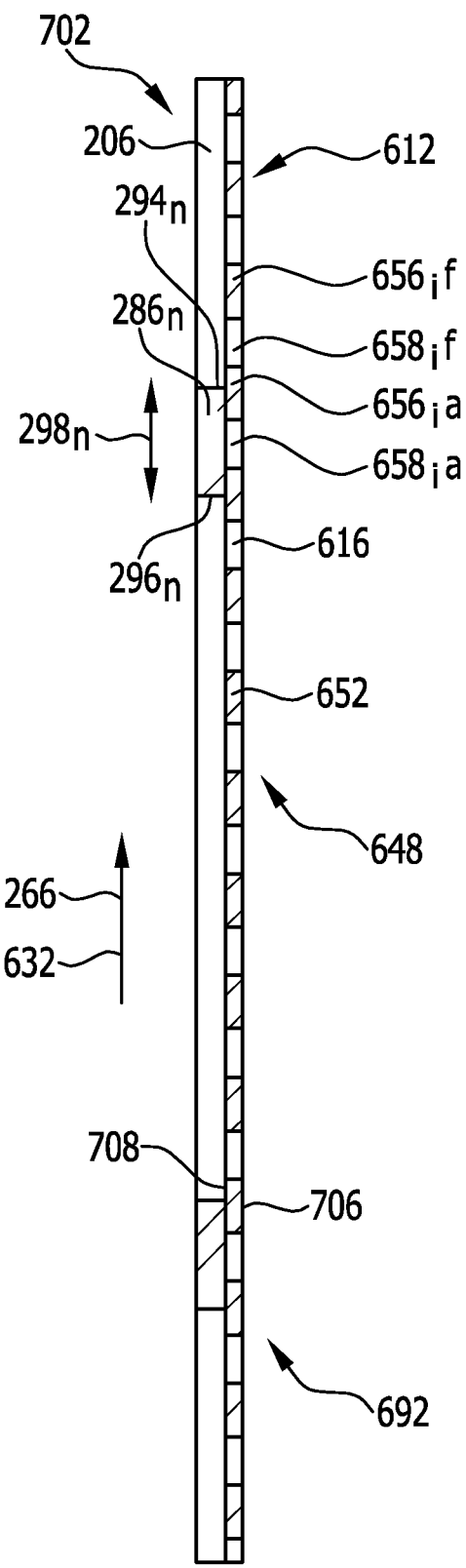
FIG. 17 shows a section XVII-XVII according to FIG. 14 along a sensing region through the brake disc and the sensor ring according to the first exemplary embodiment.

A structure influencing a magnetic field to differing degrees in a periodically varying manner is thus created peripherally, i.e. along the peripheral direction 116, as is illustrated with the section XVII-XVII shown in FIG. 14 and as is illustrated in FIG. 17, by the regular, periodic sequence of a determinable number of exposed apertures 658$f$, of seven exposed apertures 658$f$ in the exemplary embodiment, and subsequently a determinable number of covered apertures 658$a$, one covered aperture 658$a$ in the exemplary embodiment.

Here, only some of the covered and exposed apertures 658$_i$a, . . . and 658$_i$f, . . . of the covered and exposed apertures 658$a$ and 658$f$ have been identified in the Figures.

The sensor 614, in the mounting position 702, is not distanced from the sensing region 616 of the sensor ring 612 beyond the range 682 of the sensor 614, and the sensor 614 thus detects the magnetic-field-influencing effect of an area of the sensing region 616 lying in the detection region 686 of the sensor 614, and, with a rotation of the sensing region 616 together with the wheel 74 of the wheel unit 12 about the axis of rotation 114, the magnetic-field-influencing effect of the area of the sensing region 616 lying in the detection region 686 of the sensor 614 is temporally periodically different on account of the structure in the sensing region 616 influencing a magnetic field to differing degrees in a periodically varying manner, wherein the temporal periodicity is dependent on the rotational speed of the sensing region 616 and therefore on the rotational speed of the wheel 74, and therefore the sensor 614 determines the rotational speed of the wheel 74.

For this purpose, the sensor 614 requires a clear signal, which is produced by a clear structure in the sensing region 616 and which must not be influenced by the brake disc 206 adjacent to the sensor ring 612.

In the case of the arrangement according to the invention, a disruptive influencing of the sensor 614 by the brake disc 206 is avoided on account of the following conditions.

Each of the material bridges 656 significantly influences a magnetic field penetrating the region of said bridge, since the sensing region 616 of the sensor ring 612 is formed from a magnetically influencing material. Here, the influencing of the magnetic field by one of the material bridges 656 is pronounced in such a way that the sensor 614, which is arranged in the sensor region 692, does not detect one of the edges 294, 296 of one of the supporting bars 286 which is adjacent to the material bridge 656, or at most detects one of said edges only to a negligible extent.

The sensor 614, in the case of covered material bridges 656$a$ to which one of the edges 294, 296 of one of the supporting bars 286 is adjacent, thus records substantially the same signal as in the case of free material bridges 656$f$ to which none of the supporting bars 286 and also none of the edges 294, 296 is adjacent.

Here, only some of the covered and exposed material bridges 656,a, . . . and 656,f, . . . of the covered and exposed material bridges 656a and 656f have been identified in the Figures.

One of the exposed apertures 658f influences, in a clearly defined manner, a magnetic field penetrating the region of said aperture, and one of the covered apertures 658a influences, likewise in a clearly defined manner, a magnetic field penetrating the region of said aperture, wherein the way in which one of the exposed apertures 658f and one of the covered apertures 658a influence a magnetic field penetrating the region of said apertures can vary in terms of the degree to which the magnetic field is influenced.

By contrast, if one of the edges 294, 296 of the supporting bars 286 were to be adjacent to one of the apertures 658, said aperture influences a magnetic field penetrating the region of said aperture in an unclearly defined, noisy manner. The sensor 614 therefore detects a clear signal only from the exposed apertures 658f and the covered apertures 658a.

Since, in the case of the exemplary embodiment, the sequence of material bridges 656, exposed apertures 658f and covered apertures 658a is precisely defined and none of the edges 294, 296 of any of the supporting bars 286 is adjacent to any of the apertures 658, the sensor 614 receives a signal which is readily processable in order to determine the rotational speed of the wheel 74.

The anti-lock braking system 18 comprises a control unit 804, which is connected to the sensor units 78v and 78h of the front and rear wheel units 12v and 12h in a signal-transmitting manner, and a pressure regulation unit 806, which is connected to the hydraulics system 208v of the front wheel unit 12v and, in a variant, is connected similarly to the hydraulics system 208h of the rear wheel unit 12h, so as to be able to regulate the pressure in the hydraulics system 208, wherein the control unit 804 actuates the pressure regulation unit 806 depending on the measured rotational speeds of the front wheel 74v and of the rear wheel 74h, which rotational speeds are determined by the sensor unit 78 and are transmitted to the control unit 806.

The control unit 804 of the anti-lock braking system 18 determines, from the rotational speeds of the wheels 74v and 74h transferred from the sensor units 78v and 78h, the difference between the two rotational speeds of the wheels 74 and from this determines, for example in the case of an excessively large deviation of the two rotational speeds relative to one another, whether one of the wheels 74 has locked, i.e. whether the rotational speed of said wheel, compared with the rotational speed of the other wheel 74, is considerably slower, wherein the locking is caused by a heavy actuation of the actuation unit 202 of the braking device 76 and a resultant heavy braking effect of the brake caliper 204 on the brake disc 206 and therefore on the wheel 74.

For this purpose, the control unit 804 is connected to the sensor units 78v and 78h by way of example by means of electrically conductive cables, and the sensor units 78 transmit the rotational speeds of the wheels 74 in the form of electrical pulses.

The control unit 804 is also connected to the pressure regulation unit 806 by way of example by means of an electrically conductive cable and transmits control commands for the pressure regulation unit 806 in the form of electrical pulses along the cable.

If the control unit 804 has determined a locking of the wheel 74, it actuates the pressure regulation unit 806, whereupon the pressure regulation unit 806 reduces the pressure in the hydraulics system 208 of the braking device 76, for example in that the pressure regulation unit 806 diverts hydraulic fluid from the hydraulics system 208 in part into a temporary store.

As a result of the pressure reduction in the hydraulics system 208 which is brought about by the pressure regulation unit 806, the pistons 246 and 248 act on the brake pads 242 and 244 to a lesser extent and consequently press the brake pads 242 and 244 less strongly against the brake disc 206, such that the friction thereon decreases and the locking of the wheel 74 is released and the wheel 74 rolls again.

The bicycle drive system 16 comprises a sprocket wheel 848, which is arranged on the hub housing 122h of the rear wheel unit 12h, a chainwheel 852, and a chain 854, which is tensioned movably between the sprocket wheel 848 and the chainwheel 852, such that a rotational movement is transferred from the chainwheel 852 by the chain 854 to the sprocket wheel 848, and also comprises pedals 856 and 858, as is illustrated in FIG. 1.

Here, the chainwheel 852 is arranged rotatably on the frame 14, and the pedals 856 and 858 are connected to the chainwheel 852, such that the rider, who pedals on the pedals 856 and 858 and thus brings the chainwheel 852 into rotation, drives the rear wheel 74h to move in rotation as a result of the fact that the rotational movement of the chainwheel 852 brought about by the rider is transferred via the chain 854 to the sprocket wheel 848 and thus to the hub housing 122h.

Figure 18:
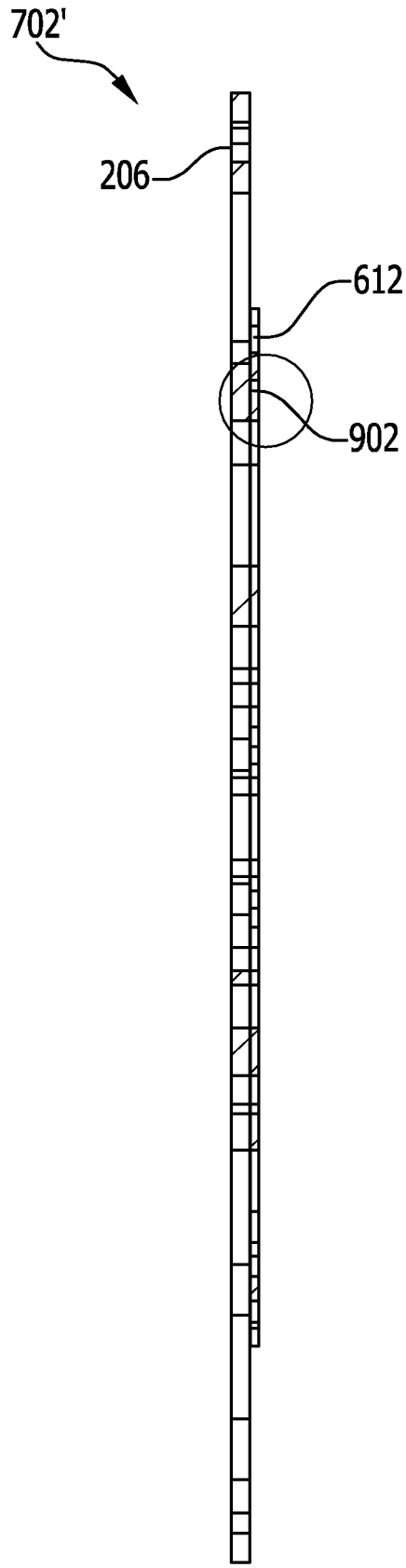
FIG. 18 shows a radial section through a second exemplary embodiment of a brake disc according to the invention, of a sensor ring according to the invention, and of an intermediate layer according to the invention.
Figure 19:
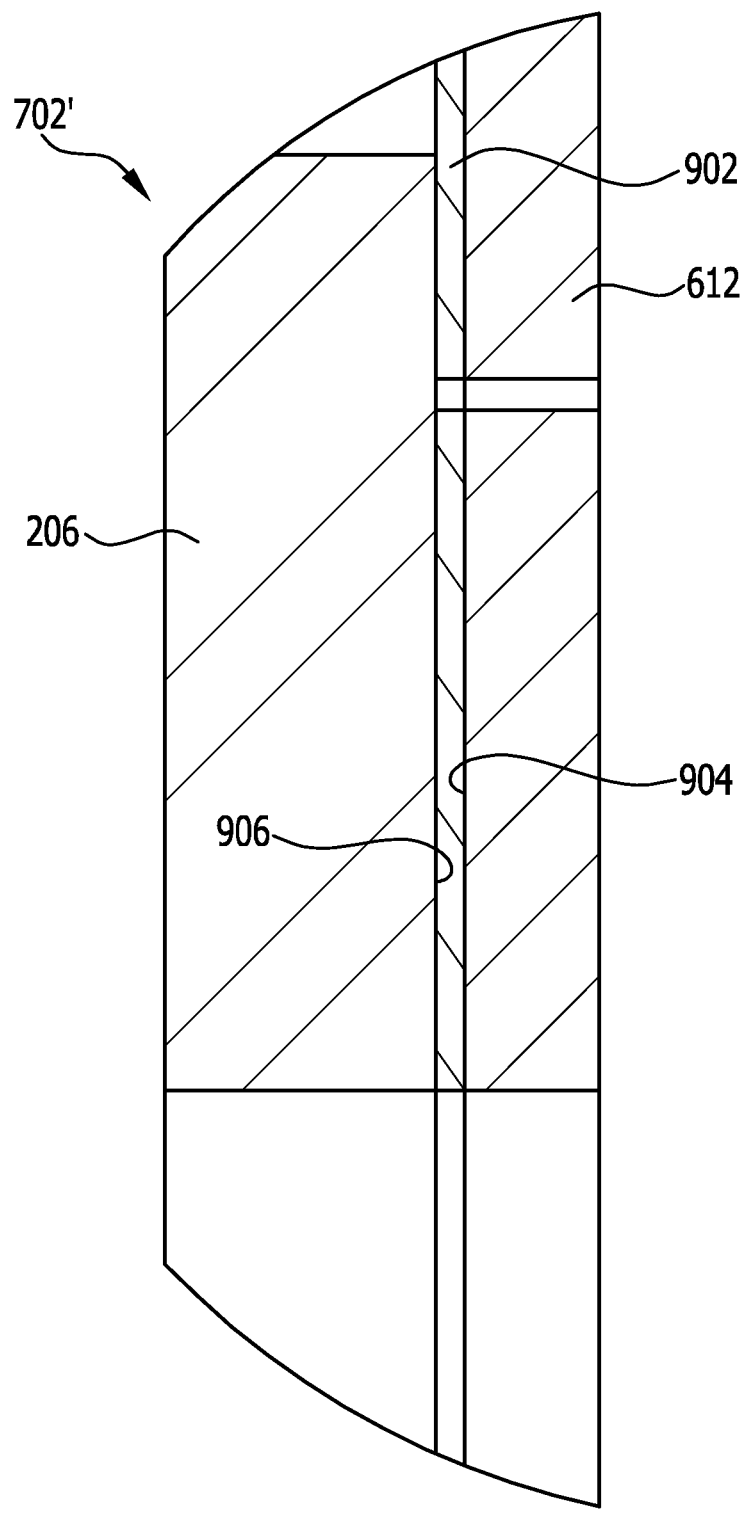
FIG. 19 shows a detail of an enlarged illustration according to FIG. 18.

In a second exemplary embodiment of a mounting position 702' according to the invention, illustrated in FIGS. 18 and 19, those parts which are identical to those of the first exemplary embodiment are provided with the same reference signs, and therefore, with regard to the description of said parts, reference can be made fully to the explanations provided for the first exemplary embodiment.

In the second exemplary embodiment, an intermediate layer 902 is provided between the brake disc 206 and the sensor ring 612, which intermediate layer bears via a first side 904 against the sensor ring 612 and bears via a second side 906 against the brake disc 206, such that the sensor ring 612 in the mounting position 702' is arranged in a manner bearing against the brake disc 206 and the sensor ring 612 is supported in particular on the brake disc 206.

For the rest, all further parts are identical to those from the first exemplary embodiment, and therefore reference can be made fully to the explanations provided in conjunction with this exemplary embodiment.

Figure 20:
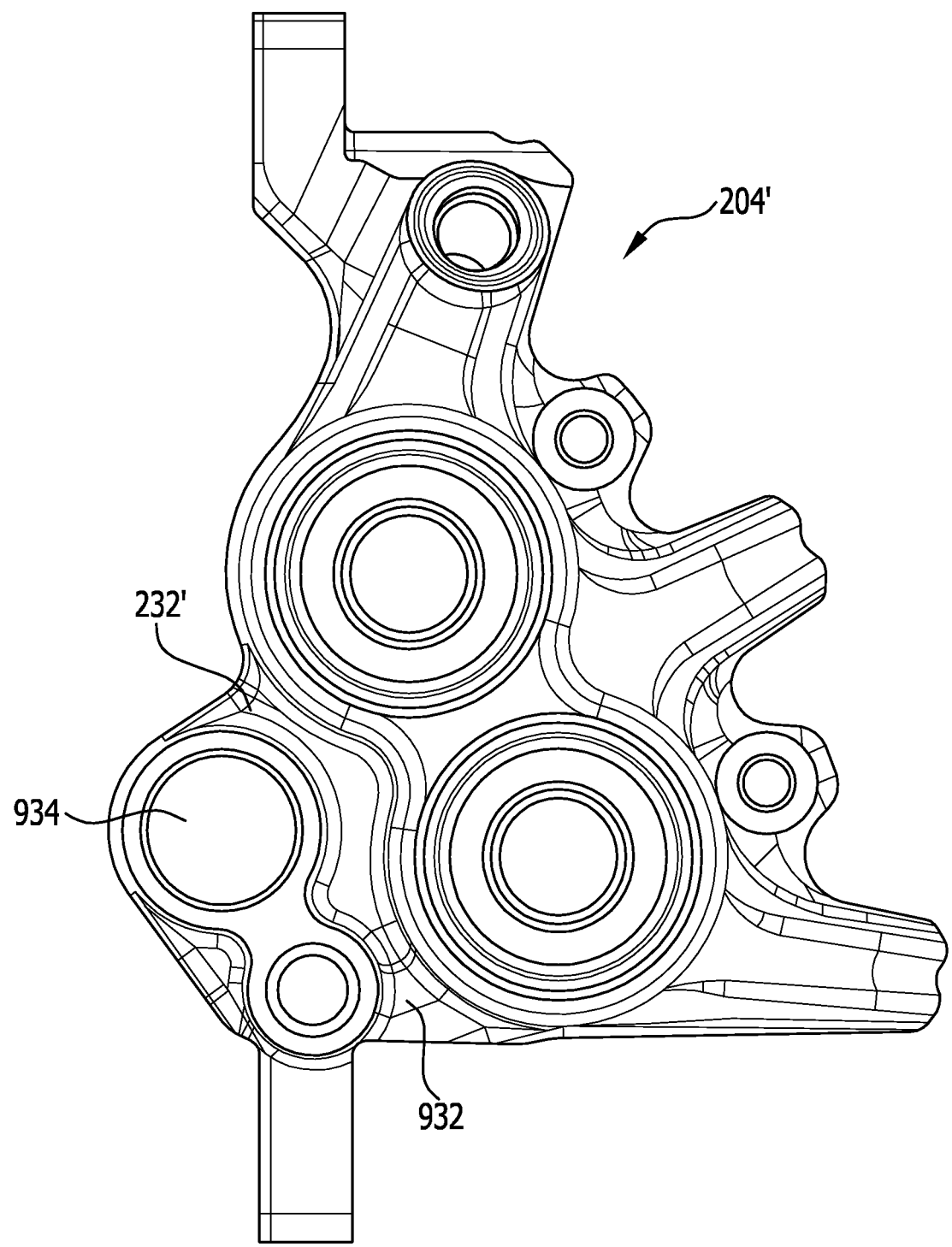
FIG. 20 shows an illustration of a third exemplary embodiment of a brake caliper according to the invention.

In a third exemplary embodiment of the solution according to the invention, illustrated in FIG. 20, those parts which are identical to those in one of the previous exemplary embodiments are provided with the same reference signs, and therefore, with regard to the description of said parts, reference can be made fully to the explanations provided for the previous exemplary embodiments.

In the third exemplary embodiment, the sensor 614' of the sensor unit 602 is arranged in the brake caliper housing 232' of the brake caliper 204'.

Here, a surround 932 is integrally formed in the brake caliper housing 232', which is illustrated in FIG. 20 without the arranged sensor 614' and without further component parts, which surround 932 surrounds a mount, 934, in which the sensor 614 is mountable.

Here, the enclosure 934 is spaced from the brake pads 242 and 244 substantially by a spacing that corresponds to the spacing of the sensing region 616 from the brake ring 282, such that the brake pads 242 and 244 are arranged so that they can cooperate with the brake ring 282 and the sensor 614' is aligned with the sensing region 616.

For the rest, all further parts are identical to those from one of the previous exemplary embodiments, and therefore reference can be made fully to the explanations provided in conjunction with these exemplary embodiments.

Figure 21:
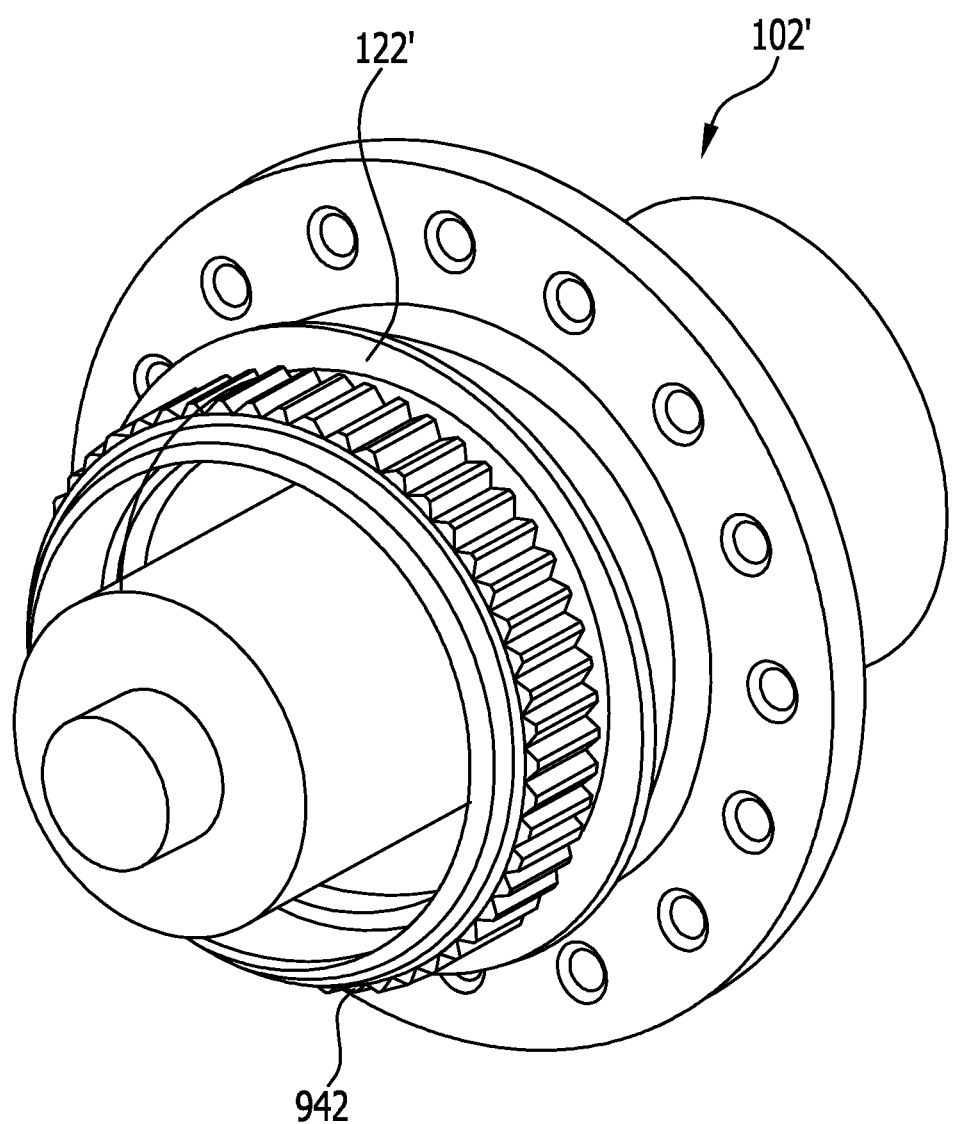
FIG. 21 shows an illustration of a fourth exemplary embodiment of a hub according to the invention.
Figure 22:
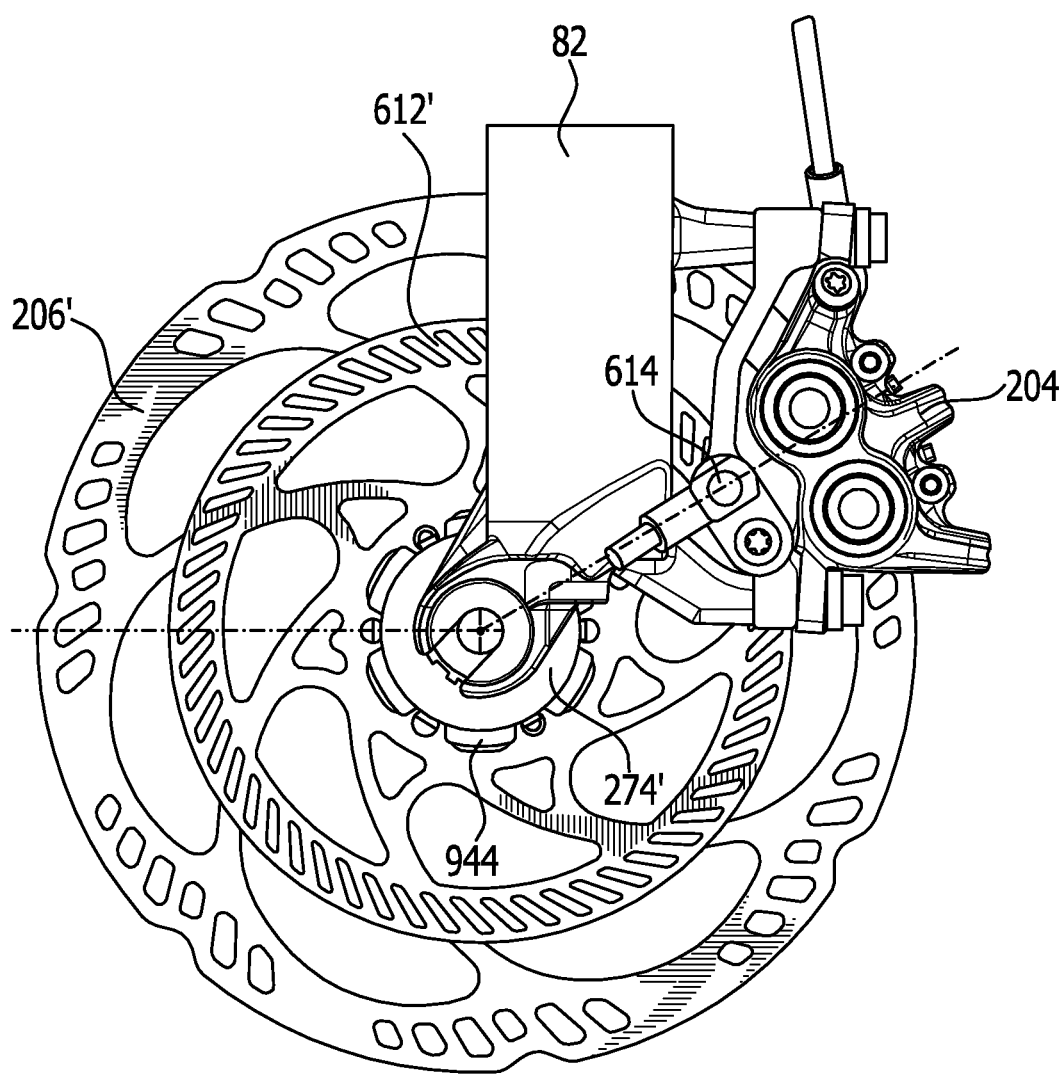
FIG. 22 shows a detail of a side view of the fourth exemplary embodiment of a wheel unit according to the invention.

In a fourth exemplary embodiment of a solution according to the invention, illustrated in FIGS. 21 to 22, those parts which are identical to those in one of the previous exemplary embodiments are provided with the same reference signs, and therefore, with regard to the description of said parts, reference can be made fully to the explanations provided in conjunction with the previous exemplary embodiments.

In the fourth exemplary embodiment a hub housing 122' of the hub 102' comprises a toothed ring 942 for mounting the brake disc 206' and the sensor ring 612'.

Here, a fastening element 274' comprises a receiving region 944 for the toothed ring 942 and the brake disc 206' and the sensor ring 612' is thus mountable on the hub 102' by means of the fastening element 274'.

Figure 23:
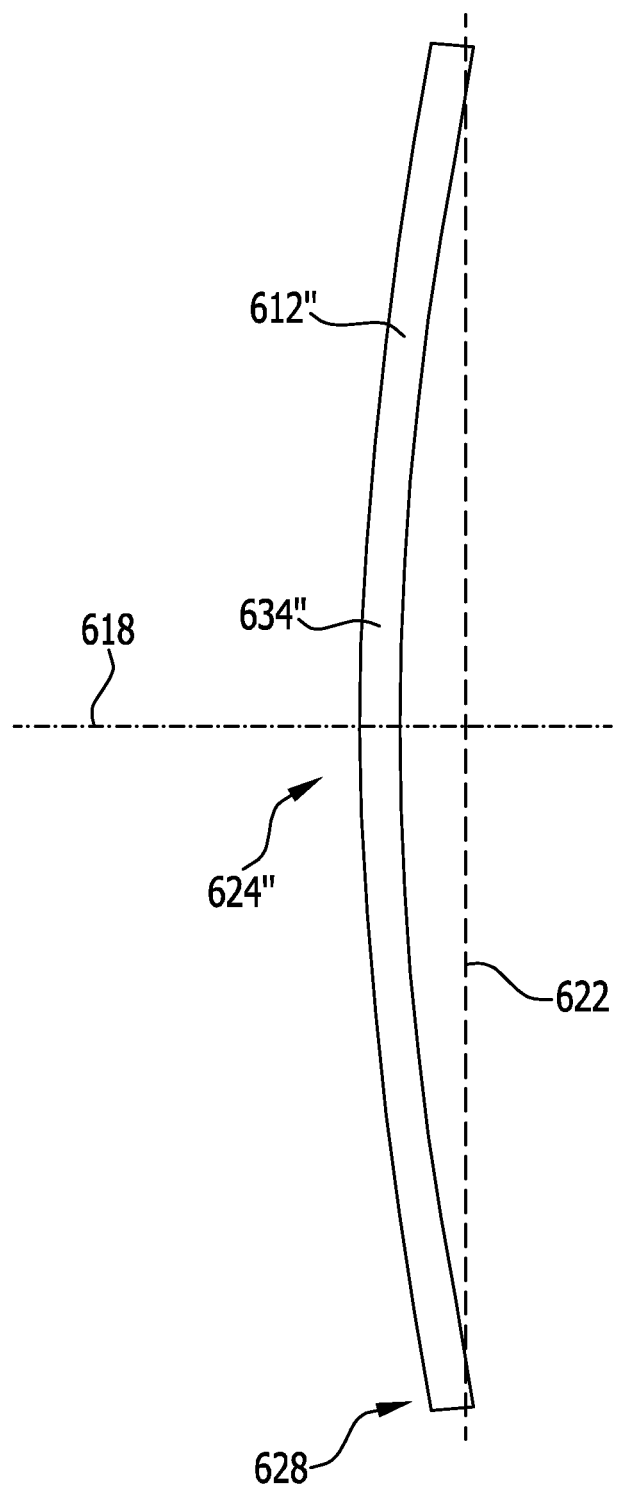
FIG. 23 shows a schematic, radial section through a second exemplary embodiment of a sensor ring according to the invention.

In a fifth exemplary embodiment of a solution according to the invention, illustrated in FIG. 23 as a schematic radial section through a sensor ring 612" according to the invention, those parts which are identical to those in one of the previous exemplary embodiments are provided with the same reference signs, and therefore, with regard to the description of said parts, reference can be made fully to the explanations provided in conjunction with the previous exemplary embodiments.

In the fifth exemplary embodiment the sensor ring 612" is provided substantially in the form of a plate, i.e. the sensor ring 612" is curved, starting from the sensor ring axis 618, in the direction that is radial relative to the sensor ring axis 618.

Here, the sensor ring 612", in its outer region 628, in particular in the sensing region 616", defines the sensor ring plane 622, and the inner region 624", in particular the mounting ring 634", is spaced from the sensor ring plane 622 in the direction that is axial relative to the sensor ring axis 618.

The sensor ring 612" is thus arranged in a manner bearing against the hub 102 under bias and bearing against the brake disc 206 under the action of a force, such that, in the mounted state, the inner region 624" and the outer region 628 of the sensor ring 612" run substantially in the sensor ring plane 622.

Here, the sensing region 616" is supported on the supporting bars 286 of the brake disc 206.

In a sixth exemplary embodiment of a solution according to the invention, illustrated in FIG. 24, those parts which are identical to those in one of the previous exemplary embodiments are provided with the same reference signs, and therefore, with regard to the description of said parts, reference can be made fully to the explanations provided in conjunction with the previous exemplary embodiments.

In the sixth exemplary embodiment the bicycle 10' according to the invention comprises an auxiliary drive 902, which is supplied with energy from a power source 904 via a power transfer element 906.

In the exemplary embodiment the power source 904 is a secondary battery, i.e. a rechargeable store for electrical energy, and the auxiliary drive 902 is supplied with electrical power via the energy transfer element 906 formed as a cable.

In a variant, provision is made that the power source 904 comprises a fuel cell which generates electrical power and by means of which the auxiliary drive 902 is supplied with power.

In a further variant the power source 904 comprises a solar cell which generates electrical power and by means of which the auxiliary drive 902 is supplied with power.

The auxiliary drive 902 comprises an electric drive motor 912, and a chainwheel 852' is integrated in the auxiliary drive 902 and is connected rotatably to the electric drive motor 912 for example via a first shaft and is connected rotatably to the pedals 856 and 858 by means of a second shaft, such that the electric drive motor 912 sets the chainwheel 852' in rotation via the first shaft and thus sets the sprocket wheel 848 in rotation via the chain 854 and thus drives the rear wheel 74h, and the rider of the bicycle 10', via the pedals 856 and 858, can set the chainwheel 852' in rotation in a similar manner via the second shaft and can thus also drive the rear wheel 74h.

For the rest, all further parts are identical to those from one of the previous exemplary embodiments, and therefore reference can be made fully to the explanations provided in conjunction with the previous exemplary embodiments.

The invention claimed is:

1. Wheel unit for a bicycle, comprising a hub and a wheel rim, which is arranged rotatably about an axis of rotation, wherein the hub and the wheel rim are connected to one another by spokes,
a brake disc and a sensor ring comprising a sensing region are arranged on the hub, and in that the sensor ring is arranged adjacent to the brake disc, the sensor ring mounted to the hub via a mounting ring, the mounting ring arranged radially inside the sensing region relative to the axis of rotation, wherein the mounting ring and brake disc mount to the hub via at least one common fastening element.

2. Wheel unit according to claim 1, wherein the sensor ring is supported on the brake disc.

3. Wheel unit according to claim 1, wherein the sensor ring is directly adjacent to the brake disc.

4. Wheel unit according to claim 1, wherein the brake disc comprises a plurality of supporting bars, which carry a brake ring.

5. Wheel unit according to claim 4, wherein N supporting bars are arranged on the brake disc and the arrangement of the supporting bars is rotationally symmetrical with respect to a rotation about a brake disc axis with an angle of 360°/N.

6. Wheel unit according to claim 4, wherein the sensing region is arranged adjacent to the supporting bars.

7. Wheel unit according to claim 6, wherein the sensing region is supported on the supporting bars of the brake disc.

8. Wheel unit according to claim 4, wherein the sensing region has a structure that varies periodically along the peripheral direction around the sensor ring axis.

9. Wheel unit according to claim 8, wherein the periodically varying structure in the sensing region is rotationally symmetrical with respect to a rotation about the sensor ring axis with an angle of 360°/kN, wherein kN corresponds to the number N of the supporting bars of the brake disc or an integer multiple thereof.

10. Wheel unit according to claim 8, wherein the periodically varying structure is configured so as to influence a magnetic field to differing degrees in a periodically varying manner along the peripheral direction around the sensor ring axis.

11. Wheel unit according to claim 8, wherein the periodically varying structure is formed by apertures and material bridges arranged in a regularly alternating manner.

12. Wheel unit according to claim 11, wherein the apertures extend in an elongate manner in a direction that is radial relative to the sensor ring axis.

13. Wheel unit according to claim 11, wherein mN apertures and mN material bridges are arranged in the sensing region, wherein mN corresponds to the number N of supporting bars of the brake disc or an integer multiple thereof.

14. Wheel unit according to claim 11, wherein the apertures and the material bridges are arranged rotationally symmetrically with respect to a rotation about the sensor ring axis with an angle of 360°/lN, wherein lN corresponds to the number N of supporting bars of the brake disc or an integer multiple thereof.

15. Wheel unit according to claim 11, wherein the apertures and the material bridges are arranged periodically between the supporting bars of the brake disc along the peripheral direction around the axis of rotation.

16. Wheel unit according to claim 11, wherein a width of the apertures transversely to the direction that is radial relative to the sensor ring axis is smaller than a width of the supporting bars of the brake disc transversely to the direction that is radial relative to the brake disc axis.

17. Wheel unit according to claim 11, wherein each edge of each of the supporting bars is arranged in an area of the sensing region that heavily influences a magnetic field.

18. Wheel unit according to claim 11, wherein each of the apertures is either fully covered by a supporting bar or is exposed, such that one group of the apertures are covered apertures and another group of the apertures are exposed apertures.

19. Wheel unit according to claim 1, wherein the sensor ring extends substantially in a sensor ring plane running perpendicularly to a sensor ring axis.

20. Wheel unit according to claim 1, wherein, in an unassembled state, an inner region of the sensor ring is spaced from a sensor ring plane, which is defined here by an outer region of the sensor ring.

21. Wheel unit according to claim 1, wherein the outer region of the sensor ring is arranged in a manner bearing against the brake disc under the action of a force.

22. Wheel unit according to claim 1, wherein retaining bars hold the sensing region on the mounting ring.

23. Wheel unit according to claim 22, wherein the sensor ring and the brake disc are arranged on the hub in such a way that supporting bars of the brake disc and the retaining bars of the sensor ring cover one another in a direction that is axial relative to the axis of rotation.

24. Wheel unit according to claim 1, wherein the wheel unit comprises a sensor for detecting the sensing region.

25. Wheel unit according to claim 1, wherein the wheel unit comprises a brake caliper, which cooperates with the brake disc in a braking manner.

26. Wheel unit according to claim 25, wherein the brake caliper comprises an enclosure, in which the sensor is arranged.

27. Wheel unit according to claim 25, wherein the sensor is arranged on a wheel suspension.

28. Wheel unit according to claim 1, wherein the hub is arranged on a wheel suspension of the wheel unit in a manner rotatable about an axis of rotation.

29. Bicycle comprising a front wheel unit and a rear wheel unit which are connected to one another by a frame, wherein at least one of the wheel units of the bicycle is in accordance with claim 1.

30. Bicycle according to claim 29, wherein the front wheel unit is in accordance with claim 1 and the rear wheel unit is in accordance with claim 1.

31. Bicycle according to claim 29, wherein the bicycle comprises a muscle-driven bicycle drive system.

32. Bicycle according to claim 29, wherein the bicycle comprises an auxiliary drive.

33. Bicycle according to claim 32, wherein the auxiliary drive comprises an electric drive motor.

34. Wheel unit for a bicycle, comprising a hub and a wheel rim, which is arranged rotatably about an axis of rotation, wherein the hub and the wheel rim are connected to one another by spokes,
a brake disc and a sensor ring comprising a sensing region are arranged on the hub, and in that the sensor ring is arranged adjacent to the brake disc, the sensor ring mounted to the hub via a mounting ring, the mounting ring arranged radially inside the sensing region relative to the axis of rotation, wherein an intermediate layer is arranged between the sensor ring and the brake disc.

35. Wheel unit for a bicycle, comprising a hub and a wheel rim, which is arranged rotatably about an axis of rotation, wherein the hub and the wheel rim are connected to one another by spokes,
a brake disc and a sensor ring comprising a sensing region are arranged on the hub, and in that the sensor ring is arranged adjacent to the brake disc, wherein the sensing region has a structure that varies periodically along the peripheral direction around the sensor ring axis, wherein the periodically varying structure is formed by apertures and material bridges arranged in a regularly alternating manner, wherein the brake disc comprises a plurality of supporting bars and wherein an edge of each of the supporting bars is covered by one of the material bridges in the sensing region.

36. Wheel unit for a bicycle, comprising a hub and a wheel rim, which is arranged rotatably about an axis of rotation, wherein the hub and the wheel rim are connected to one another by spokes,
a brake disc and a sensor ring comprising a sensing region are arranged on the hub, and in that the sensor ring is arranged adjacent to the brake disc, wherein the brake disc comprises a plurality of supporting bars, which carry a brake ring, and
wherein the supporting bars of the brake disc are arranged periodically along the peripheral direction around the axis of rotation to form a periodically varying structure of the sensing region.

37. Wheel unit for a bicycle, comprising a hub and a wheel rim, which is arranged rotatably about an axis of rotation, wherein the hub and the wheel rim are connected to one another by spokes,
a brake disc and a sensor ring comprising a sensing region are arranged on the hub, and in that the sensor ring is arranged adjacent to the brake disc, wherein the sensing region has a structure that varies periodically along the peripheral direction around the sensor ring axis, wherein the periodically varying structure is formed by apertures and material bridges arranged in a regularly alternating manner, and
wherein the brake disc comprises a plurality of supporting bars and wherein each of the plurality of supporting bars fully covers at least one of the apertures.

38. Wheel unit for a bicycle, comprising a hub and a wheel rim, which is arranged rotatably about an axis of rotation, wherein the hub and the wheel rim are connected to one another by spokes,
a brake disc and a sensor ring comprising a sensing region are arranged on the hub, and in that the sensor ring is arranged adjacent to the brake disc, wherein the sensing region has a structure that varies periodically along the peripheral direction around the sensor ring axis, wherein the periodically varying structure is formed by apertures and material bridges arranged in a regularly alternating manner, wherein each of the apertures is either fully covered by a supporting bar or is exposed, such that one group of the apertures are covered apertures and another group of the apertures are exposed apertures, and wherein the covered apertures and the exposed apertures are arranged periodically along the peripheral direction around the sensor ring axis.

* * * * *